(12) United States Patent
Gupta et al.

(10) Patent No.: US 9,718,185 B2
(45) Date of Patent: Aug. 1, 2017

(54) SYSTEM AND METHOD FOR REINFORCING PROGRAMMING EDUCATION THROUGH ROBOTIC FEEDBACK

(71) Applicant: Play-i, Inc., San Mateo, CA (US)

(72) Inventors: Saurabh Gupta, San Mateo, CA (US); Vikas Gupta, San Mateo, CA (US)

(73) Assignee: Play-i, Inc., San Mateo, CA (US)

( * ) Notice: Subject to any disclaimer, the term of this patent is extended or adjusted under 35 U.S.C. 154(b) by 0 days.

(21) Appl. No.: 15/299,292

(22) Filed: Oct. 20, 2016

(65) Prior Publication Data

US 2017/0036344 A1    Feb. 9, 2017

Related U.S. Application Data

(63) Continuation of application No. 14/737,347, filed on Jun. 11, 2015, now Pat. No. 9,498,882.

(60) Provisional application No. 62/011,478, filed on Jun. 12, 2014, provisional application No. 62/015,969, filed on Jun. 23, 2014.

(51) Int. Cl.
| | |
|---|---|
| G06F 19/00 | (2011.01) |
| B25J 9/00 | (2006.01) |
| B25J 13/06 | (2006.01) |
| G09B 19/00 | (2006.01) |
| G05B 15/02 | (2006.01) |

(52) U.S. Cl.
CPC .............. *B25J 9/0081* (2013.01); *B25J 13/06* (2013.01); *G05B 15/02* (2013.01); *G09B 19/0053* (2013.01); *Y10S 901/04* (2013.01)

(58) Field of Classification Search
CPC ...................................................... B25J 9/0081
See application file for complete search history.

(56) References Cited

U.S. PATENT DOCUMENTS

| | | |
|---|---|---|
| 5,638,522 A | 6/1997 | Dunsmuir et al. |
| 6,668,211 B1 | 12/2003 | Fujita et al. |
| 2002/0120362 A1 | 8/2002 | Lathan et al. |
| 2004/0186623 A1 | 9/2004 | Dooley et al. |
| 2011/0276058 A1 | 11/2011 | Choi et al. |
| 2012/0259464 A1 | 10/2012 | Morioka et al. |
| 2012/0296471 A1 | 11/2012 | Inaba et al. |
| 2013/0324004 A1 | 12/2013 | Schwartz |
| 2014/0047406 A1 | 2/2014 | Lam et al. |
| 2014/0067124 A1 | 3/2014 | Williamson et al. |
| 2015/0224640 A1 | 8/2015 | Vu et al. |

FOREIGN PATENT DOCUMENTS

WO    2012103525 A2    8/2012

*Primary Examiner* — Bhavesh V Amin
(74) *Attorney, Agent, or Firm* — Jeffrey Schox; Diana Lin

(57) ABSTRACT

A method for toy robot programming, the toy robot including a set of sensors, the method including, at a user device remote from the toy robot: receiving sensor measurements from the toy robot during physical robot manipulation; in response to detecting a programming trigger event, automatically converting the sensor measurements into a series of puppeted programming inputs; and displaying graphical representations of the set of puppeted programming inputs on a programming interface application on the user device.

20 Claims, 16 Drawing Sheets

SYSTEM AND METHOD FOR REINFORCING PROGRAMMING EDUCATION THROUGH ROBOTIC FEEDBACK

CROSS-REFERENCE TO RELATED APPLICATIONS

This application is a continuation of U.S. patent application Ser. No. 14/737,347, filed on 11 Jun. 2015, which claims the benefit of U.S. Provisional Application Nos. 62/011,478 filed 12 Jun. 2014, and 62/015,969 filed 23 Jun. 2014, all of which are incorporated in their entireties by this reference.

TECHNICAL FIELD

This invention relates generally to the programming education field, and more specifically to a new and useful system and method for reinforcing programming education through robotic feedback in the programming education field.

BACKGROUND

There has been a recent emphasis in the education field to teach children and young people programming. Many view programming as a useful skill in our computerized world, and there are several core concepts that could be introduced at an early stage. However, the complexity around programming makes it a challenging topic to introduce to children. The concepts can be viewed by children as too difficult or not interesting enough. Thus, there is a need in the programming education field to create a new and useful system and method for reinforcing programming education through robotic feedback. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Reinforcing Programming Education Through Robotic Feedback

Figure 1A:
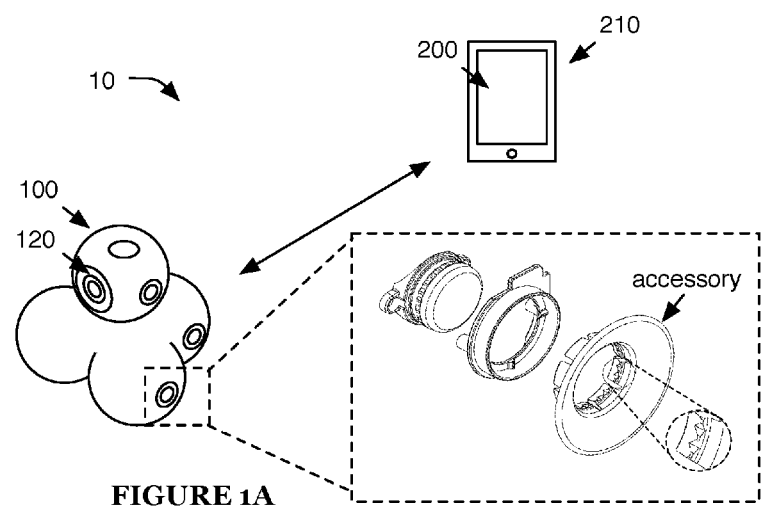
FIG. 1A is schematic representation of a variation of the system.

As shown in FIG. 1A, a system 10 for reinforcing programming education through robotic feedback can include an interactive robot 100 and at least one programming interface application 200. In particular, the system can include a distinct physical robotic "toy" in wireless or wired communication with an application operable on a user device. The system functions to provide a set of tools through which a child (or any user) can explore programming concepts and experience the result of programming. The system preferably leverages partial operational dependence between the interactive robot and the programming interface application, but can alternatively allow the interactive robot to operate entirely independently, or enable any other suitable method of robot control.

1.1 Interactive Robot.

Figure 1B:
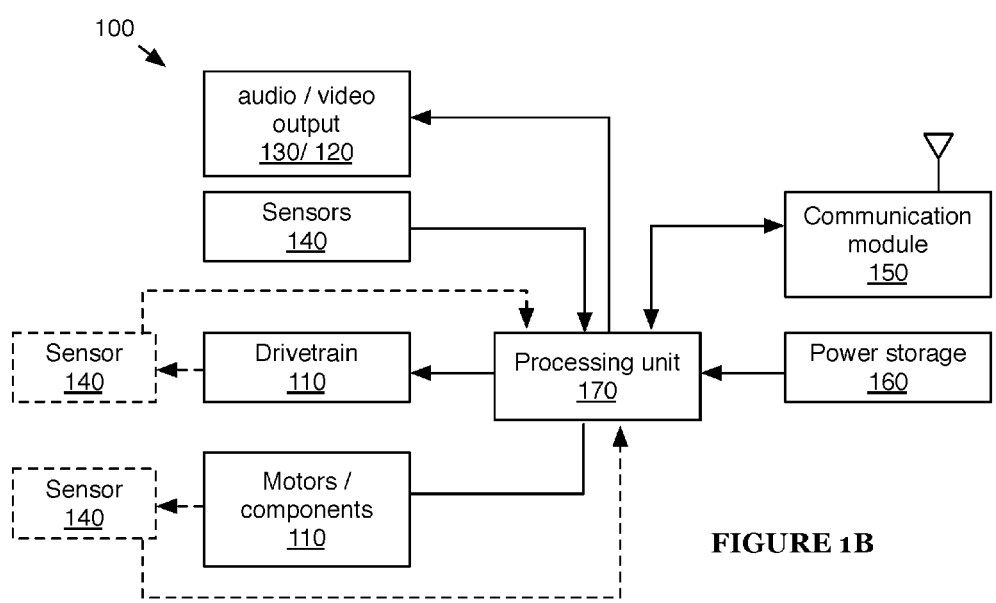
FIG. 1B is a schematic representation of a variation of the robot.

As shown in FIG. 1B, the interactive robot 100 preferably includes a set of outputs, a set of sensors, and a communication module. The interactive robot functions as a programmable device, and can interact with its environment independent of the programming interface application, offload processing and operational decisions to the programming interface application when the robot and programming interface application are in communication, or operate in any other suitable manner.

The interactive robot 100 is preferably able of interacting with an environment. In one variation, the robot is a physical robot, and capable of interacting with a physical environment. In a second variation, the robot is a virtual robot, and is capable of interacting with a virtual environment. The interactive robot can have any suitable form factor, but is preferably structured to represent some anthropomorphized robot such as the wheeled robot shown in FIG. 1A. However, any suitable form of the interactive robot can be used. In some alternative embodiments, the interactive robot can be a simulated interactive avatar in a simulated environment. The interactive robot preferably includes components configured to support operation of an interactive robot such as a power system, a processing unit, storage, and other suitable elements.

The output of the interactive robot functions to interact with the physical environment surrounding the robot, with one or more users, with other interactive robots, or with any other suitable endpoint. The outputs can include motion devices 110, visual outputs 120, audio output 130, or any other suitable output. The outputs are preferably arranged on the robot, but can alternatively be remote outputs controlled by the robot, or be arranged in any other suitable location.

The motion devices 110 can include controllable mechanical elements such as motorized wheels (e.g., a drivetrain), motorized appendages (e.g., head, legs, feet, arms, hands, tail, etc.), motorized accessories (e.g., ball launcher, eyes, etc.), haptic feedback (e.g., vibrator motors), and other suitable motion devices. The motion devices can additionally include motorized mounting points configured to permanently or removably retain robot accessories, wherein the motorized mounting points can actuate about a rotational axis, along a longitudinal axis, or in any other suitable direction. The motorized mounting points can retain the accessories along the rotational axis, wherein the accessories can be freely rotatable relative to the mounting points, statically coupled to the mounting point, rotatable in a first angular direction about the mounting point (e.g., wherein the accessory or mounting point is ratcheted), or otherwise coupled to the mounting point. However, the robot can include any other suitable motion device.

The visual outputs 120 can include controllable lighting system(s), a graphical display, or any suitable visual display. In one example, the visual output includes a set of individually indexed light emitting elements, wherein each light emitting element can be individually controlled by the processor. The light emitting elements can be LEDs, OLEDs, or any other suitable light emitting element. However, the robot can include any other suitable visual output. The audio output 130 can include speakers, transducers, or any other suitable mechanism capable of generating audio waves. However, the robot can include any other suitable output.

The input of the interactive robot functions to receive user inputs at the robot, receive inputs from other robots, receive inputs from auxiliary sensors remote from the robot, measure parameters of the ambient environment, measure robot operational parameters, or provide any other suitable information. The interactive robot can respond to the inputs according to the programming. The interactive robot can additionally or alternatively stream the input information to a remote user device, wherein the remote user device can process, store, or otherwise handle the input information.

The inputs can be one or more sensors 140, but can alternatively or additionally be interfaces for communicatively coupling with one or more sensors (e.g., connectors, etc.). Sensor inputs can include motion detector, distance sensors, imaging systems (e.g., CCD sensor, CMOS sensor, camera, etc.), depth cameras (e.g., structured light sensor systems), inertial sensors (e.g., inertial measurement units, accelerometers, gyroscopes, magnetometer, tilt sensors, etc.), force sensors (e.g., pressure sensors, etc.), touch sensors (e.g., a set of electrodes, etc.), user inputs (e.g., buttons, analog controls, etc.), and/or any suitable type of input. The sensors can additionally include system monitoring sensors that function to monitor robot operational parameters, ambient environment parameters, or any other suitable parameters. Examples of monitoring sensors include motor monitoring systems (e.g., rotary encoders, mechanical encoders, magnetic encoders, optical encoders, resolvers, Hall effect sensors, back EMF monitoring systems, etc.), light sensors, audio sensors (e.g., microphones), temperature sensors, and pressure sensors, but the robot can include any other suitable sensor.

The communication module 150 of the robot functions to transfer information between the robot and a data endpoint. The data endpoint can be the programming interface application, a user device, server system, or be any other suitable device. The communication module 150 is preferably a transceiver, but can alternatively be a receiver, transmitter, or be any other suitable communication system. The communication module 150 can be wired or wireless. The communication module 150 can be an IR system, RF system, beacon system (e.g., ultrasound, RF), light modulation system, NFC system, Wi-Fi system, GSM system, Bluetooth system, mesh system, cellular system, Ethernet system, powerline communication system, or be any other suitable communication system.

The robot 100 can additionally include a power storage unit 160 that functions to store energy and supply power to active robot components. The power storage unit is preferably arranged on-board the robot, but can alternatively be remote. The power storage unit 160 can be a primary battery, secondary battery (rechargeable battery), fuel cell, or be any other suitable power supply.

The robot 100 can additionally include a processing unit 170 that functions to control the robot outputs, communication system, or other components. The processing unit 170 can independently and/or automatically control the robot based on sensor measurements and stored control instructions. The processing unit 170 can additionally or alternatively operate the robot based on control instructions received from the programming interface application 200, user device 210, or other remote control system. The processing unit 170 can additionally or alternatively adjust or otherwise modify the received control instructions (e.g., based on the stored robot personality, sensor measurements, etc.). The processing unit 170 can be a processor, microprocessor, GPU, CPU, or be any other suitable processing unit. The processing unit can additionally include digital memory (e.g., flash memory, RAM, etc.) that functions to permanently or temporarily store information. The stored information can be control instructions (e.g., a robot personality), sensor measurements or other input, identifier information (e.g., robot identifier information, user identifier information, user device identifier information, etc.), or be any other suitable information. The processing unit can include a local control system that functions to control the robot independent of the programming interface application, and can additionally include a remote control system that functions to control the robot based on control instructions received from the remote control device. The remote control system is preferably accessed through a programming interface application, but can alternatively be accessed through a remote cloud computing system or accessed in any other suitable manner. The local control system can store inputs, process programming configuration, direct output control, and provide any suitable form of control. In some variants, the local control system can be configured with a personality configuration.

A personality configuration of an embodiment of the robot functions to supply behavioral pattern directives. The personality configuration preferably characterizes the type of actions and control instructions that is executed by the interactive robot. The personality configuration can define output responses to inputs. For example, the personality configuration can specify that the robot should perform a dance when it detects a change in the lighting, sound an alarm when it detects motion, should avoid objects when driving, or perform any suitable logic. The personality configuration is preferably updatable, and preferably evolves or otherwise updates according to interactions and programming received from the programming interface application. The personality configuration preferably initializes in a new instance of an interactive robot as a base personality. In one preferred implementation, base personality defines default or minimal response logic, which functions to simulate an uneducated/simple new robot. The personality configuration preferably updates through robot and/or application interactions. Over time, the personality configuration updates to provide customized response logic at least partially set through interactions of a user. At least a portion of the personality configuration is stored and maintained on the interactive robot such that the robot can conform to personality-based behaviors independent of the application (e.g., when the robot is disconnected from or not controlled by a user device). The personality configuration can additionally or alternatively be stored and managed remotely (e.g., by the application or in a remote cloud platform).

In a specific variation, the robot 100 includes a set of opposing motorized mounting points configured to removably connect to a set of accessories and/or rotate about a shared rotational axis; a set of visual output mechanisms (e.g., individually indexed and controllable light emitting elements, such as LEDs); a set of audio output mechanisms (e.g., speakers); a set of inertial sensors configured to determine robot orientation relative to a gravity vector or other external reference point; a set of light sensors; a set of audio sensors; a motor monitoring system for each or a subset of the robot motors; a set of buttons; and a wireless communication mechanism (e.g., a Bluetooth communication mechanism). The robot can additionally include a motorized drivetrain, a processor, non-volatile memory, on-board power storage (e.g., a secondary or rechargeable battery) electrically connected to the active robot components, and/or include any other suitable component. However, the robot can have any other suitable component or configuration.

1.2 Programming Interface Application.

The programming interface application 200 functions to provide a programming and interaction control interface to the interactive robot. The programming interface application 200 functions to receive programming inputs from a user, and can additionally or alternatively transform the programming input into a second computer language (e.g., target language, such as assembly language or machine code). The programming interface application 200 can additionally or alternatively provide audio and/or visual feedback to the user.

The programming interface application 200 preferably runs on (e.g., is supported by) a user device 210, but can alternatively be run on a remote server or on any other suitable computing system. The user device is preferably remote from the robot (e.g., separate and distinct from the robot, not physically connected to the robot, etc.), but can alternatively be connected to the robot, mounted to the robot, or otherwise associated with the robot. The user device can be any suitable computing device, such as a mobile device (e.g., smartphone, tablet, etc.), wearable computer, a desktop computer, a TV-connected computer, a mobile phone, another electronic toy, or any suitable computing device. The system can include one or more programming interface applications that can interact with the interactive robot.

The programming interface application 200 preferably includes a user interface configured to promote programming and setting of robot logic. Various approaches to programming can be applied as described such as robot animation, robot puppeting, visual programming, and direct programming. When in communication with the interactive robot, the programming interface application preferably provides a substantial portion of control instructions. Input data captured by the interactive robot can be communicated to the programming interface application (e.g., in near-real time, at a predetermined frequency, at a variable frequency, at a fixed frequency, etc.), where the input data is processed and transformed into response data, which is then communicated to the interactive robot to be executed. Alternatively, the control instructions can have any suitable distribution between the interactive robot and the programming interface application. The use of the programming interface application preferably facilitates updating and modification of the personality instance of a robot.

The programming interface application 200 preferably uses a robot application programming interface or a software development kit, which functions to facilitate interfacing with the robot. Any suitable programmatic interface can be used. The interface is preferably generalized for use with various applications and uses. Preferably, there are multiple programming interface applications that can be selectively (or simultaneously) in control of the robot.

The programming interface application 200 can additionally supplement the components of the interactive robot. For example, the programming interface application can be used to supply audio output. The programming interface application can similarly use sensors of the computing device to supplement or replace the inputs of the interactive robot.

The system can additionally include a remote cloud platform that can facilitate account management, personality synchronization, and other suitable features.

2. Method for Reinforcing Programming Education Through Robotic Feedback

Figures 2A, 2B:
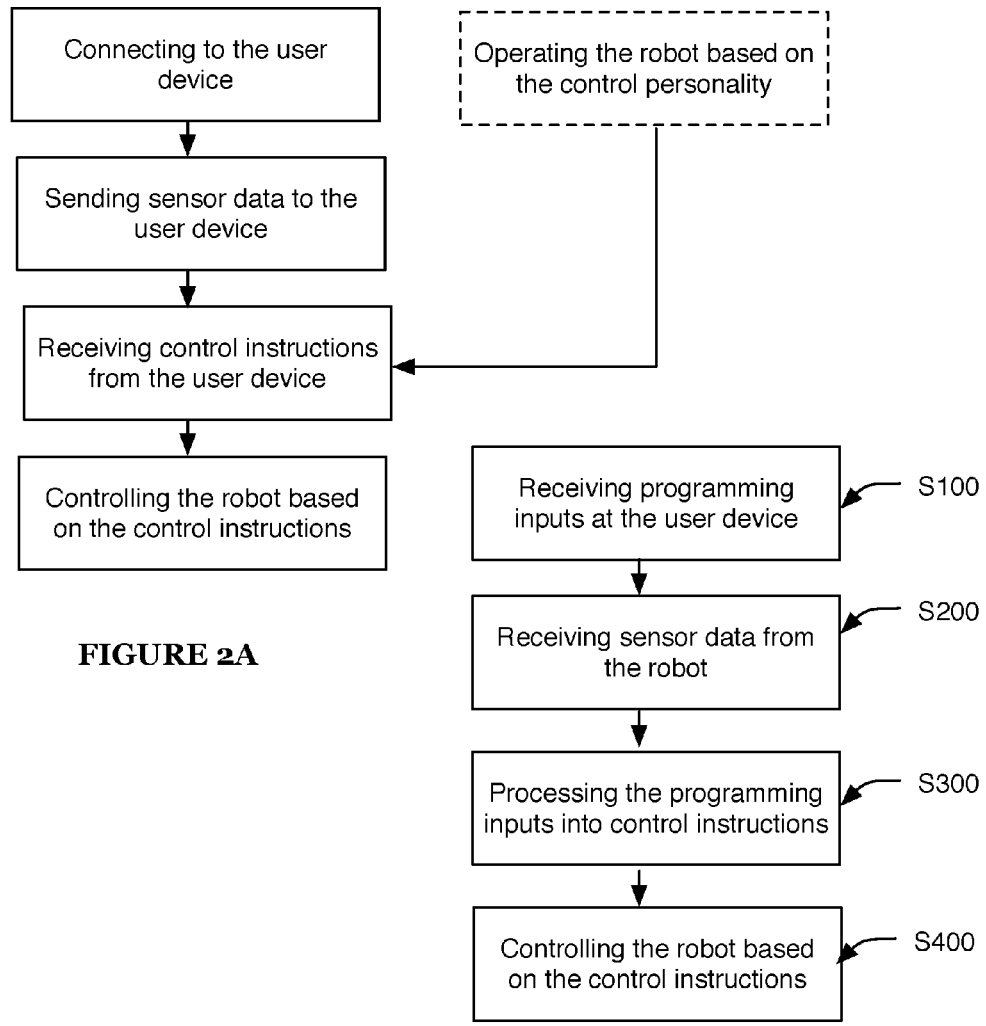
FIG. 2A is a flowchart representation of a variation of the method, as performed by the robot.
FIG. 2B is a flowchart representation of a variation of the method, as performed by the user device.
Figure 3:
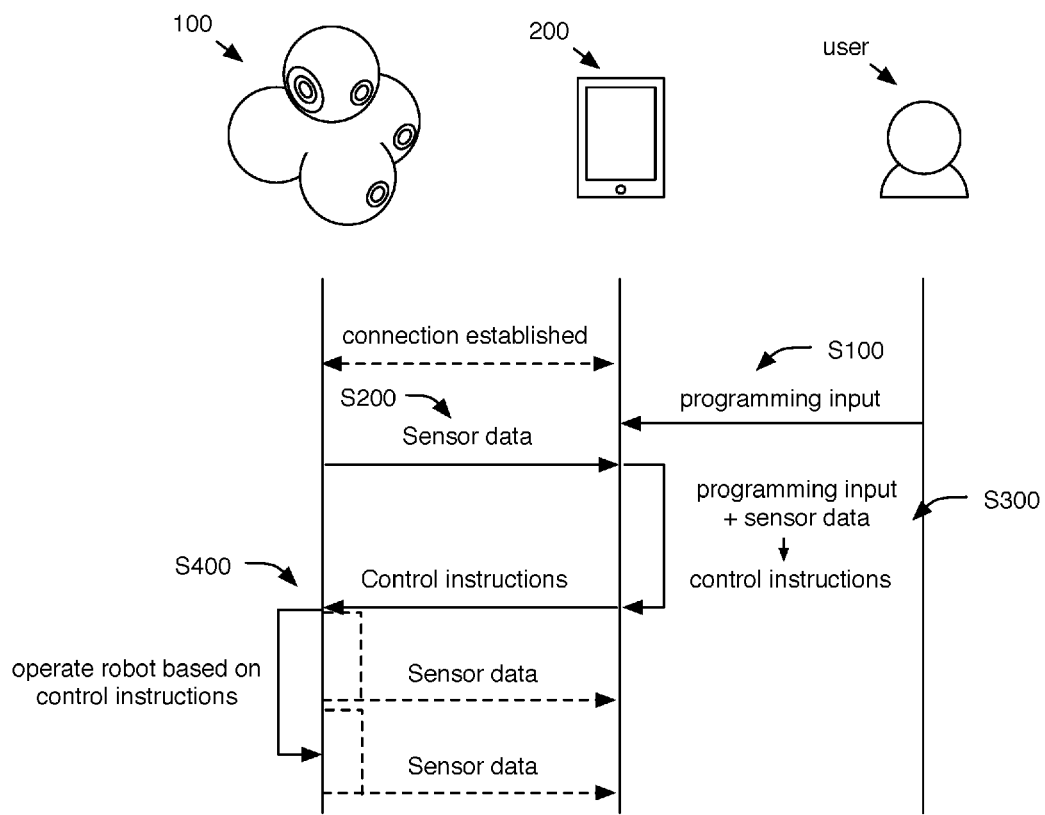
FIG. 3 is a schematic representation of a variation of the method, as performed by the system.

As shown in FIG. 2B and FIG. 3, a method for reinforcing programming education through robotic feedback includes: receiving programming inputs at the user device S100; receiving sensor data from the robot at the user device S200; processing the programming inputs, based on the sensor data, into control instructions S300; and controlling the robot based on the control instructions S400. The method can additionally include controlling a robot according to a control personality S500, receiving programming input, and updating the control personality based in part on the programming input.

The method functions to provide a character-based outlet for programming actions to encourage programming concepts through interactive play. The method can additionally function to enable a user (e.g., a child) to program the robot in real- or near-real time. The method preferably leverages toy-based play interactions through the progressive development and programming of a controllable entity. The method is preferably applied to control of an interactive robot entity such as in the system described above, but the method can alternatively be applied to progressive development and programming of any suitable character based entity. For example, the method can alternatively be applied to a virtual robot (or any suitable avatar) in a simulated environment. The virtual robot is preferably represented through a graphical representation of the simulated environment. The method preferably uses a robot entity that obtains environmental information and then responds through actions. Robot control can be partially or entirely directed through programming obtained from an application.

In one variation of robot operation, the robot can stream sensor information (recorded by the robot, such as sensor measurements) to the programming interface application (supported by a remote user device), wherein the user device can generate control instructions for the robot based on the sensor information. The user device can stream the control instructions to the robot, wherein the robot operates based on the control instructions, such that the user device can remotely control the robot. The robot can stream the sensor information in real- or near-real time (e.g., as the measurements are recorded), in batches, at a predetermined frequency, in response to a transmission event (e.g., the full execution of a control instruction), or at any other suitable frequency. In a second variation of robot operation, the robot can automatically operate based on a personality configuration or other stored control information. However, the robot can operate in any other suitable manner.

This method of robot operation can confer several benefits over conventional systems. First, the method provides a variety of programming approaches that promote continued learning and investigation of programming concepts while also providing a variety of programming interfaces suitable for children of a variety of ages and cognitive ability. The method is preferably applied within a robotic programming platform where users can progress at different rates, interact, share knowledge, and share use of robots or other suitable devices used as programming outlets.

Second, the method provides control personalities as a mechanism for providing channels of learning and expressing programming lessons. Completing programming lessons or experimenting with various concepts can result in customization of robots behavior, which can be directly or indirectly related to programs set by a user.

Third, by shifting all or most of the processing to the remote user device, the robot requires a reduced amount of on-board processing power, which can reduce the cost of robot manufacture. Offloading the processing can additionally enable the system to react in near-real time to programmatical inputs (e.g., code or programming component entry) at the programming interface application, such as by controlling the robot to immediately perform the action specified by the input programming component. This is possible because the remote user device concurrently functions as both the control system and as the programming interface. Additionally, the system can immediately detect faults (e.g., situations in which the robot action associated with the programming component cannot be performed) and notify the user of these faults.

In contrast, conventional remote control systems only permit users to enter control instructions for the robot, and do not permit or promote use of programming inputs (e.g., programming components) to control robot operation. As such, conventional remote control systems do not encourage users to learn programming concepts. This system and method is also differentiated over conventional programming systems and methods, which require entire control programs to be pre-written, compiled, then loaded onto the robot for execution. These systems do not confer this system and method's benefits of real-time feedback and debugging, because the programs are written entirely independently of robot execution.

2.1 Receiving Programming Inputs at the User Device.

Receiving a set of programming inputs at the user device S100 functions to obtain a programming configuration from a user. The programming inputs can be programming components, programming routines, scripts, application logic, compiled application objects, or any suitable configuration that can direct control instructions of a robot. The set of programming inputs can include one or more programming inputs, and can define a control path. When the set includes multiple programming inputs, the set can be time-ordered (e.g., be a series or sequence of programming inputs), be unordered, or have any other suitable relationship between programming inputs of the set. The programming inputs are preferably programming statements expressing robot actions to be carried out, but can additionally or alternatively be simple statements, compound statements, or be any other suitable programming statements. However, the programming inputs can be expressions or be any other suitable programming input.

The set of programming inputs is preferably received through a programming interface application running on a user device. However, the programming inputs can be received in any other suitable manner. The programming interface application can be an application website, physical controller, or other suitable interface through which programmed behavior can be specified. The user device can be remote from the robot, physically connected to the robot (e.g., by a wire), mounted to the robot, or be otherwise associated with the robot. The programming inputs are preferably received from a user, but can alternatively be received from a second robot, a remote computing system (e.g., a server), or from any other suitable source. The programming inputs can be received before, during, or after robot connection with the user device; before, during, or after robot execution of the programming inputs; or be received at any other suitable time. The programming inputs can represent robot movement, robot audio output, robot visual output, a conditional statement, or represent any other suitable robot functionality (robot capability) or programming statement.

The set of programming inputs can be received in a variety of different ways, through a variety of different programming interface applications, wherein each programming interface applications is capable of interfacing with the robot. Alternatively, the programming input can be received through a single programming interface application, received thorough a set of different programming interface modes, or received in any other suitable manner. The robot interface, more preferably a robot software development kit but alternatively any other suitable robot interface, can additionally or alternatively provide a variety of programming input modes, each capable of interfacing with one or more programming interface applications, but the programming input modes can alternatively be natively enabled within an application. Examples of programming modes include a puppeteering programming mode S110, an animation programming mode S120, a visual programming mode S130, and a programming language mode, but any other suitable programming input mode can be used. The various programming input modes can be used separately or in any suitable combination. The various programming modes can have various advantages and can appeal to different users based on skill levels.

The programming input can be received through free-form programming performed by a user (i.e., where no particular directive is supplied). Alternatively, the programming input can be received and processed within a particular challenge presented in an application. A sequence of challenges can be presented, which guide a user through various objectives. The set of challenges can be used to incrementally introduce new programming concepts. The set of challenges can additionally update based on the capabilities of a robot. For example, particular accessories can enable different functionality of a robot, and the available challenges can depend on the available abilities. The robot personality can additionally be developed by proceeding through the successive challenges. In one variation, different robot personalities can be developed based on the way the user addresses the challenges. For example, the robot personality can be more "cautious" or "deliberate" if the user systematically uses the same set of programming inputs to address the challenge, while the robot personality can be more "adventurous" if the user quickly attempts to use previously unused programming inputs to address the challenge. However, robot programming gamification can be otherwise used.

Once a control path is captured using the animation mode, puppeteering mode, and/or any suitable mode, the control path is usable as an action of the robot. A captured control path is preferably represented as a graphical object in a user interface that can be combined and positioned within the user interface to define when the control path is used. Various conditional statements can be added to the control path, and can be organized as a sequential sequence of actions, as a state machine of different action states, or used as programming directives in any suitable manner. Control paths can additionally be stored, downloaded, and shared. The control paths can be combined, grouped, and layered. In one implementation, multiple control paths can be manipulated on a layered timeline in a user interface. Each layer of the timeline can refer to different outlets of a robot or any suitable aspect.

Control paths and groups of control paths can be assigned an identifier, wherein the identifier can be used to reference the control paths in other programming semantics such as in a programming language script or in a visual programming mode. Additionally, the method can include generating control instructions based on the control paths. The control instructions (control directives) are preferably low-level control directives for robot components or subassemblies. In one variation, the control path can be processed to produce a set of mid-level to high-level control instructions. These higher-level control instructions can be decomposed into a set of control primitives, which are preferably sent to the robot and can additionally be exposed through the user interface. Control primitives can include instructions like left(10), right(10), forward (2.3), sound(recording1.mp3), and right arm(10, 5). Decomposing a control path into control primitives can illustrate how a user could programmatically construct a control path. Additionally it can enable a user to quickly get a general set of control instructions, and then manually modify the control instructions to suit logic requirements. There can additionally be multiple layers of abstraction accessible to a user, such as the high-level control path object, a mid-level programming inputs, low-level robot control instructions, and subassembly-level control primitives. The level exposed can be selected by the user or can be automatically presented based on the detected programming level of a user. In a second variation, decomposing a control path can include classifying a control path. Patterns in the control path can be used to automatically label a control path object. The classification preferably provides a descriptive name of the type of controls expressed in the control path. For example, a control path where the robot goes forward and turns right can be labeled as "Turn right around corner", and a control path where the robot contacts a wall and then reverses direction can be labeled as "turn around at wall".

2.1.1 Programming Mode Variants.

Figure 6:
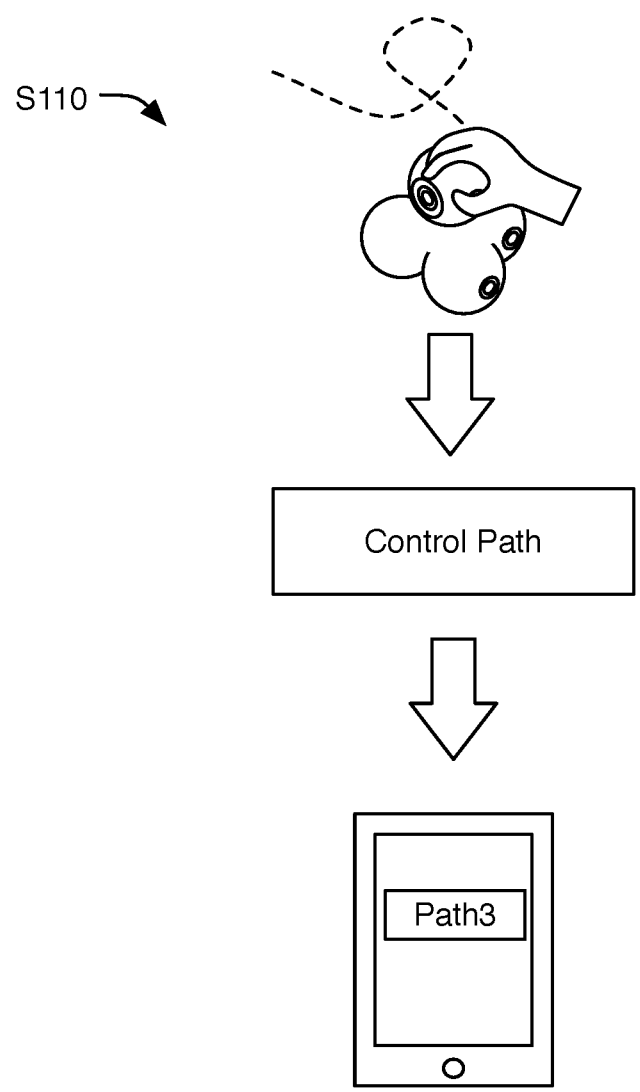
FIG. 6 is a schematic representation of the system operating in a puppeteering programming mode.

The puppeteering programming mode S110 can include recording physical manipulations of a robot as a control path, which functions to enable children to program the robot by handling the toy robot. The control path can be translated into programming inputs, which can be rendered on the programming interface application, edited on the programming interface application, subsequently used to control the robot (or a second robot), or be used in any other suitable manner. As shown in FIG. 6, a user can define a rich sequence of actions through physical play with the robot. In a first example, the path of a robot can be recorded as a user pushes the robot around on the floor. In a second example, the robot head, tail, or mounting point actuation can be recorded as the control path as a user moves the respective component. The puppeteering can preferably be used in a manner substantially similar to that of the animation mode, except that instead of interacting with the programming interface application, a user performs or acts out the desired actions on the robot.

Recording physical manipulations of a robot as a control path can include: capturing sensor data of the robot during physical robot manipulation S112, and translating the sensor data into a control path S114. The method can additionally include translating the control path into a set of programming inputs (e.g., programming statements), rendering representations of the programming inputs on the user device, and receiving modifications to the programming inputs.

Capturing sensor data of the robot during physical manipulation S112 functions to capture information indicative of the control path desired by the user. The sensor data (e.g., manipulation sensor data, sensor measurement, etc.) can be captured and provided by the robot, by the user device, a remote server system, by a secondary robot, by an auxiliary sensor remote from the robot, or by any other suitable computing system. In one example, capturing the sensor data can include recording and storing the puppeteering sensor data at the robot, then sending the puppeteering sensor data to the user device after the physical manipulation ceases. In a second example, capturing the sensor data can include streaming the sensor data in real- or near-real time to the remote user device, wherein the remote user device can store and process the sensor data.

Capturing the sensor data S112 can include recording the sensor data as the data is generated by the sensors, translating the sensor signals into secondary signals and recording the secondary signals, or capturing the signals in any other suitable manner. The sensor data is preferably data (e.g., measurements) from sensors on-board the robot (e.g., sensors of the robot), but can alternatively be data from sensors on secondary devices remote from the robot, aggregate data generated from sensor measurements (e.g., data indicative of sensor, component, or subsystem performance, etc.), or be data from any other suitable source. For example, the programming interface application on the user device can instruct a user to record the robot during the physical robot manipulation (e.g., using the user device camera, microphone, inertial sensor, or other sensor), wherein the recorded sensor measurements can be subsequently analyzed (e.g., using vision analysis techniques, audio spatial analysis techniques, etc.) to extract the control path.

The manipulation sensor data can be one or more pieces of data, collected from one or more sensors. The sensor data can be a single sensor measurement or signal, a time-ordered series or sequence of sensor data (e.g., wherein each sensor measurement or signal is associated with a relative or absolute timestamp), a time-agnostic set of sensor data, or be any other suitable set of data organized in any other suitable manner. The sensor data can be a sensor measurement or signal value, a sensor measurement type (e.g., a binary indication of whether a given sensor or sensor type has recorded a measurement), a sensor measurement categorization, or be any other suitable sensor data. The sensor data can be the sensor data used for robot control (e.g., the data used by the robot processor to control robot operation, the data sent to and used by the remote user device to control robot operation, etc.), or be other data. The sensor measurements can include inertial sensor measurements (e.g., from the on-board accelerometer, gyroscope, magnetometer, etc.); position measurements (e.g., absolute position, such as from GPS, triangulation, trilateration, or other absolute position determination systems, relative position, such as from beacons or other relative position determination systems, etc.), camera measurements (e.g., images or video); audio measurements; ambient light measurements; motor feedback, such as measurements of motor angular position (e.g., from a rotary encoder, current feedback, etc.) and/or measurements of motor motion; or include any other suitable measurement of any other suitable robot operation parameter or environmental parameter.

In a first example of capturing manipulation sensor data S112, the motor position feedback is recorded and subsequently used to determine motion of the component controlled by the motor. In a second example of capturing sensor data, ambient audio and/or video can be recorded during physical robot manipulation, wherein the same or similar audio and/or video clips can be subsequently played back. The recorded audio and/or video clip can additionally be subsequently analyzed to extract instructions (e.g., a voice saying "shine red light"), which can be added to the subsequently generated set of puppeteering programming statements. In a third example of capturing sensor data, an audio and/or video clip can be played in response to selection or actuation of a button, wherein an identifier for the audio and/or video clip is stored in association with the set of sensor data. In a specific example, the audio and/or video clip identifier is stored with a timestamp identifying the time at which the audio and/or video clip was played during the manipulation period. However, any other suitable sensor data can be captured and subsequently used.

The manipulation sensor data is preferably captured during physical manipulation of the robot, but can alternatively be captured at any other suitable time. The sensor data can be captured after a puppeteering trigger event (physical programming trigger event) is detected, continuously captured (wherein a secondary process on the robot or user device determines which data to retain or discard), or captured in response to the occurrence of any other suitable recordation event. The trigger event can be the detection of an application of an external force on the robot, determination of a button actuation (e.g., on the robot or on the user device), determination of an icon selection, or be any other suitable trigger event. Detecting application of an external force on the robot can include detecting robot motion different from the motion specified by a control instruction is detected.

In a first example, application of an external force can be detected when a robot arm is actuated, but the control instructions did not specify robot arm actuation and/or the robot processor did not control the arm to actuate. In a specific example, the motor position feedback of the motor controlling the arm can be compared to an expected position feedback (e.g., based on the amount of power provided to the motor) to identify the external force application. In a second example, application of an external force can be detected when the robot moves faster (e.g., in speed or acceleration) than the anticipated speed determined based on the amount of power provided to the motor. However, the external force can be determined in any other suitable manner. The sensor data is preferably recorded as puppeteering sensor data (e.g., puppeteering sensor measurements, etc.) until a stop event is detected, but can alternatively be recorded from any suitable duration of time. The stop event can be determination of a button actuation, determination of an icon selection, determination of robot input cessation (e.g., when physical manipulation has ended), or be any other suitable stop event.

Capturing the manipulation sensor data S112 can additionally include enabling physical manipulation of the robot. Physical manipulation of the robot can be enabled in response to detection of the trigger event or enabled at any other suitable time. In one variation, enabling physical manipulation of the robot includes assigning robot outputs to select robot inputs. For example, a first light output (e.g., a red light emitted by light emitting element 2) can be assigned to a first button and a first audio output can be assigned to a second button. In a second variation, enabling physical manipulation of the robot can additionally include adjusting the resistance on actuation components (e.g., lowering resistance provided by the motors for the drivetrain, head, tail, arms, or other components) while in puppeteering mode. However, physical robot manipulation can be enabled in any other suitable manner.

Translating the manipulation sensor data into a control path S114 functions to convert the sensor data into instructions for subsequent robot control. The control path can include a set of control instructions (control directives) for a robot or include any other suitable data. The set of control instructions is preferably a series or sequence of control instructions, with relative or absolute timestamps associated with each instruction, but can alternatively be a time-agnostic set of control instructions, or be organized in any other suitable manner. The sensor data is preferably automatically converted into the control path, but can alternatively be converted into the control path in response to receipt of a user input, manually converted, or otherwise converted. The sensor data is preferably converted into the control path by the user device, but can alternatively be converted by the robot or by any other suitable computing system.

Figure 8:
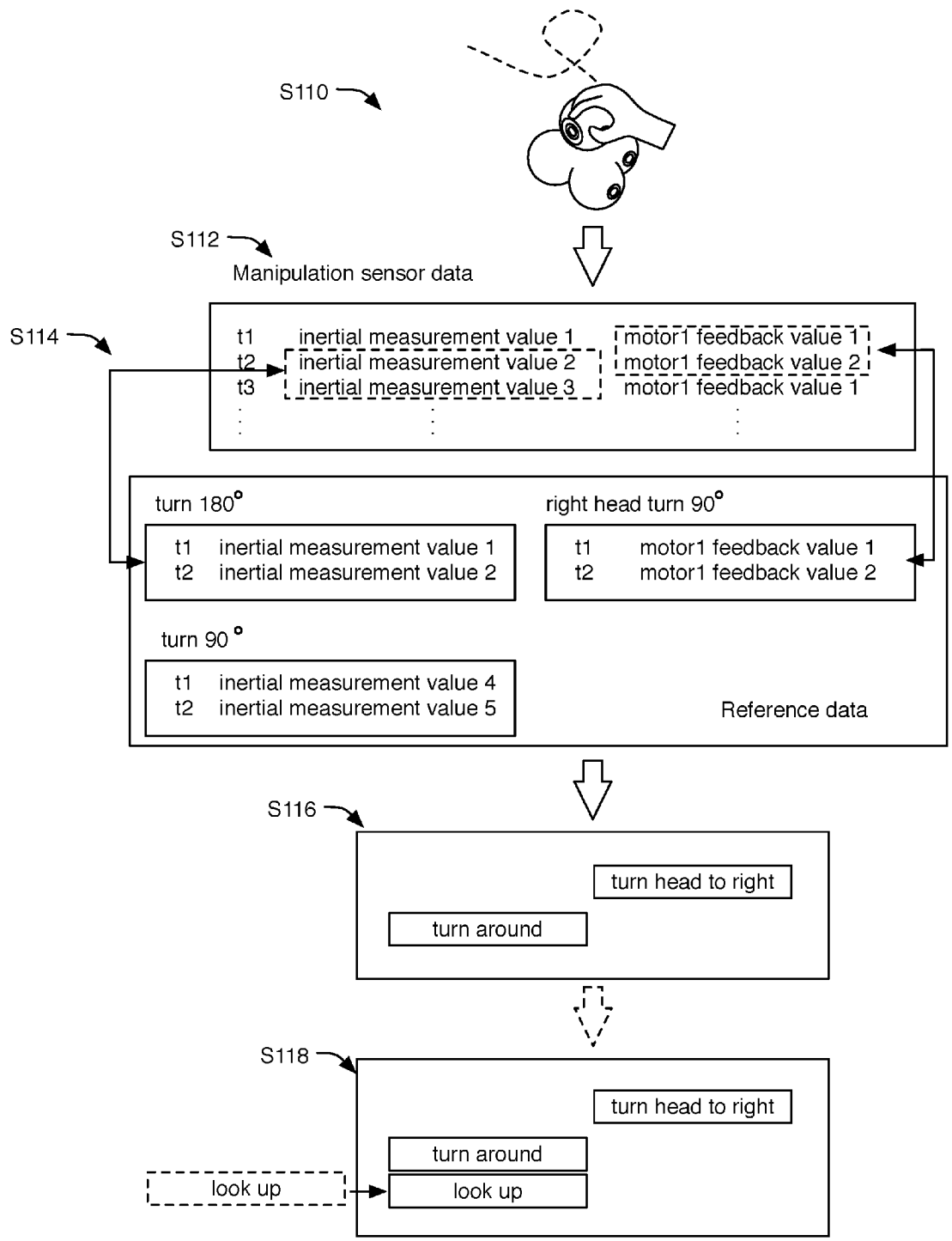
FIG. 8 is a schematic representation of the system operating in the puppeteering programming mode, including translating the manipulation sensor data into a set of manipulation programming inputs.

Translating the manipulation sensor data into a puppeted control path can include identifying a control instruction by comparing the sensor data to predetermined reference data, wherein the predetermined reference data is associated with the control instruction (an example of which is shown in FIG. 8). However, the control instructions can be computed from the sensor data, estimated from the sensor data, or otherwise determined based on the sensor data. The identified control instruction can be subsequently added to a set of puppeted control instructions (the puppeted control path) at a position (e.g., temporal position, spatial position, etc.) corresponding to the position of the matching sensor data within the manipulation sensor data set. The predetermined reference data can additionally be used to verify performance of the control instruction during remote robot control. However, the sensor data can be translated into a control path in any other suitable manner. The manipulation sensor data can be translated into the control instructions in real time, near-real time, after the physical manipulation period, or at any other suitable time. In one variation, comparing the sensor data to predetermined reference data includes substantially matching (e.g., matching exactly; matching within a threshold margin of error, such as within 5%; matching using fuzzy logic, etc.) the recorded sensor data patterns with predetermined reference sensor data patterns, wherein each predetermined reference sensor data pattern is associated with a control instruction. In one example, a left turn can be detected in response to the left motor encoder measuring a slower rate of motor rotation than that measured by the right motor encoder of the robot drive train.

In a second variation, comparing the sensor data to predetermined reference data includes substantially matching (e.g., matching exactly; matching within a threshold margin of error, such as within 5%; matching using fuzzy logic, etc.) patterns within the recorded sensor measurement values with predetermined reference sensor measurement value patterns, wherein each predetermined reference sensor measurement value pattern is associated with a control instruction. The values can be absolute values, value rate of change (e.g., speed, acceleration, etc.), or be any other suitable value. In one example, the robot speed can be determined based on the rate of motor rotation, as determined based on motor encoder measurements. However, the control instructions can be otherwise determined from the sensor data.

Figure 7:
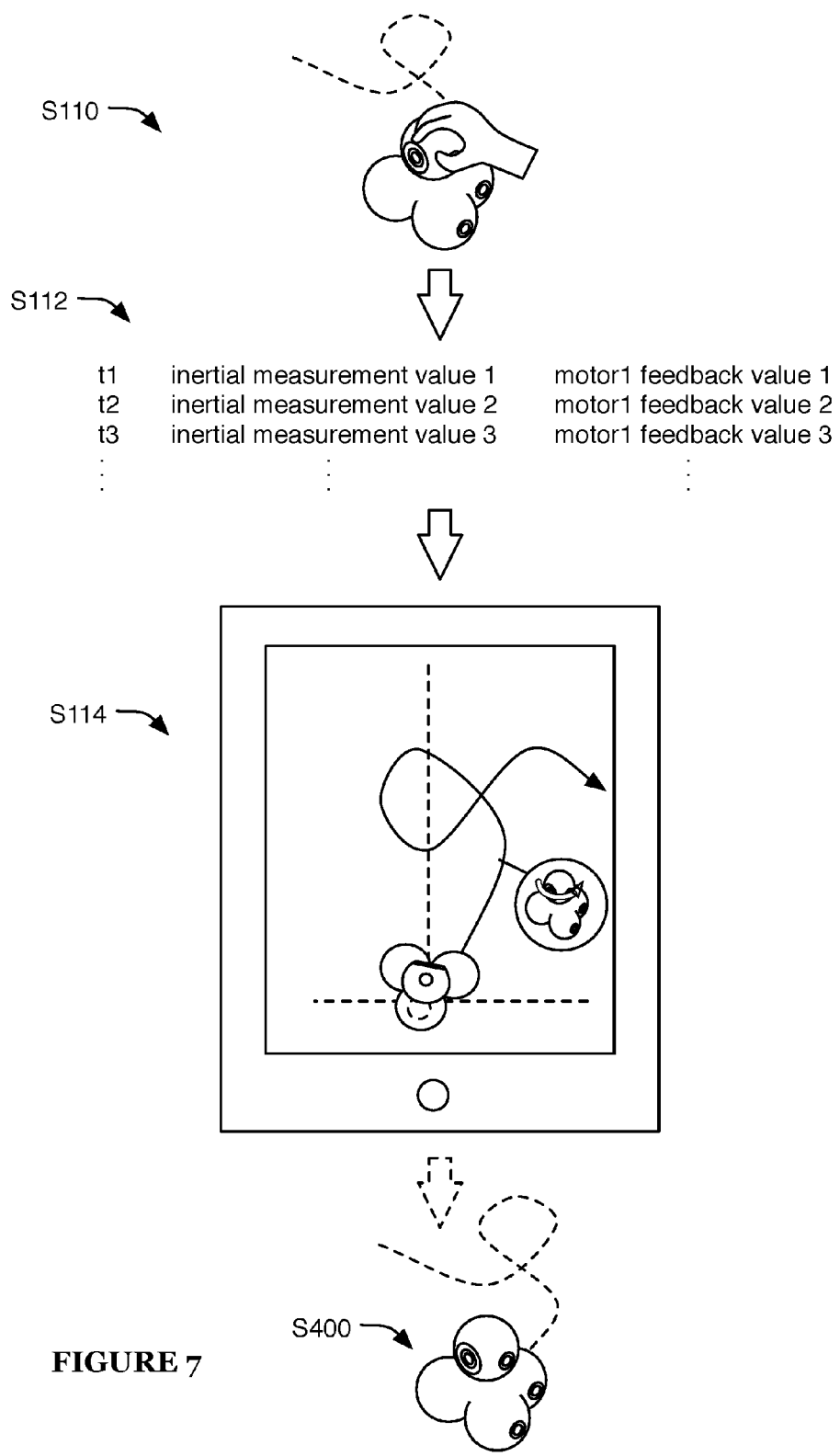
FIG. 7 is a schematic representation of the system operating in the puppeteering programming mode, including translating the manipulation sensor data into a graphical control path.

Recording physical robot manipulations can additionally include translating the puppeted control path into a set of puppeted programming inputs S116 (an example of which is shown in FIG. 7 and FIG. 8). This can function to show a user the set of programming inputs that would be required to program the robot to act in the manner specified by the physical manipulation. The puppeted control path can be translated into the puppeted programming inputs in real time, near-real time, after the physical manipulation period, or at any other suitable time. The control path can include a series or sequence of time-ordered control instructions, or be a set of control instructions organized in any other suitable manner. The set of programming inputs can include a series or sequence of time-ordered programming inputs, or be organized in any other suitable manner. The programming inputs can be programming components (e.g., as shown in FIG. 8), virtual vectors (e.g., as shown in FIG. 7), or be any other suitable programming input. Translating the control path into a set of programming inputs preferably includes matching (e.g., matching exactly; matching within a threshold margin of error, such as within 5%; matching using fuzzy logic, etc.) a pattern of one or more control instructions from the control path to a predetermined reference control instruction pattern, wherein the predetermined reference control instruction pattern is preferably associated with a programming input. The identified programming input can be subsequently added to a set of puppeted programming inputs at a position (e.g., temporal position, spatial position, etc.) corresponding to the position of the matching control instructions within the puppeted control instruction set. However, the programming input can be calculated, generated, or otherwise determined from the control path.

The method can additionally include translating the supplemented robot actions into external control directives, which functions to instruct an external component or user to manipulate the robot. The external control directives (e.g., user action prompts or instructions) can be associated with one or more (e.g., a pattern) of supplemented robot actions.

The external control directives can be presented (e.g., rendered on the programming interface application, played by the robot, or otherwise presented) during robot manipulation playback (e.g., similar to robot operation in the user device programming mode), but can be presented as a component within the manipulation set of programming inputs, or be presented at any other suitable time. In one example, when the robot is lifted during the manipulation process (and the robot lacks a vertical translation mechanism), the external control directives can be speech audio directing user actions against the robot. In the stairs example above, an external control directive can play the message of "lift me up about a foot".

Recording physical robot manipulations can additionally include rendering representations of the programming inputs, which functions to display graphical representations of the set of puppeted programming inputs on a programming interface application on the user device (examples shown in FIG. 7 and FIG. 8). The programming input graphical representation can be one or more paths, icons (e.g., callouts placed along the path), blocks representing programming components, written code, or be any other suitable graphical representation. The programming input graphical representation can be rendered in real time, near-real time (e.g., as the programming input is determined based on the sensor data), after the physical manipulation period, or at any other suitable time.

Recording physical robot manipulations can additionally include modifying the set of puppeted programming inputs S118, which can function to approximate the physical manipulation or adjust the path played back by the robot. The set of puppeted programming inputs is preferably modified after the physical robot manipulation period has ended, but can alternatively be modified during physical robot manipulation or at any other suitable time. The set of puppeted programming inputs can be modified by the user, automatically modified by the programming interface application (e.g., to accommodate for or remove supplemental robot actions), or be modified in any other suitable manner.

In one variation, the user can add and/or remove programming inputs from the set of puppeted programming inputs (e.g., by deleting or adding programming inputs, dragging and dropping graphical representations of programming inputs, etc.).

In a second variation, when the set of actions can include supplemented robot actions, or robot actions that are not be perfectly reproducible into a set of robot control directives (e.g., the sensor data can be imperfect or the actions performed on the robot can be physically impossible to be performed by the robot without aid). This variation can additionally include identifying the supplemented robot actions and modifying the set of puppeted programming inputs. This can be performed by the robot, by the programming interface application, or by any other suitable component. Identifying the supplemented robot actions functions to identify robot actions falling outside a predefined scope of robot actions. Identifying the supplemented robot actions can include identifying patterns or values of sensor data (or other suitable information associated with robot action) that do not match a predetermined reference pattern or value (e.g., identifying deviant sensor data patterns), or identifying patterns or values of sensor data that match a predetermined reference pattern or value for supplemental actions. The set of predetermined reference patterns or values that the sensor data is compared against is preferably the reference patterns or values associated with autonomous robot capabilities (e.g., robot actions that the robot can perform using only the on-board components), but can additionally include the reference patterns or values associated with auxiliary robot capabilities (e.g., robot actions that the robot can perform using auxiliary components, such as an action enabled by an arm removably coupled to the robot), reference patterns or values associated with a predetermined set of supplemental actions (e.g., reference patterns or values associated with robot actions outside of on-board capabilities), or be any other suitable reference pattern or value. However, the supplemented robot actions can be otherwise determined.

In one example, the reference pattern associated with a predetermined set of supplemental actions can be a series of acceleration measurements along a vector opposing gravity, as determined from an inertial sensor (e.g., accelerometer or gyroscope), which can be associated with the robot travelling in a vertical direction. If a user records moving the robot up a flight of stairs, the vertical motion may not be achievable by the locomotion capabilities of the robot.

In a third variation, the programming inputs or external control directives can be automatically modified. In a first example of automated manipulation programming input modification, if the sensor data indicates that the robot was lifted vertically, then moved forward, the method can include automatically determining the jumping force and angle (e.g., applied by the tail against a support surface) required to approximate the vertical and horizontal distance travelled, and replacing the external control directive or other representation of the step with the jumping control instructions. In a second example of automated manipulation programming input modification, if the sensor data indicates that the robot travelled forward to the left then forward to the right, the method can include automatically replacing the detected path with a straight path in the forward direction. This replacement can occur in response to the deviation from the straight path falling below a threshold deviation (e.g., below 25%), wherein the threshold deviation can be the cutoff indicating a user intent (but incapability) to move the robot forward in a straight line. However, the manipulation programming inputs can be otherwise adjusted or modified. In one example of manual manipulation programming input modification, the method can include receiving modifications (e.g., additions, removals, reordering, parameter adjustments, etc.) to the puppeted path (e.g., set of manipulation programming inputs) from the user at the programming interface application.

The puppeteering mode S110 can additionally support capturing conditional events during the path. Setting a conditional event can require interaction with the programming interface application, but can additionally be triggered through input through the robot. For example, a robot can have a button to trigger a particular type of conditional event capture. In a specific example, the method can include detecting the conditional event recordation indicator, recording an input (e.g., a clap or voice input) at the robot, recording a set of conditional event sensor data after input recordation, then associating the programming inputs determined based on the conditional event sensor data with the input. The method can additionally include classifying the input and rendering a graphical representation of the input (e.g., as text, a block, an image, etc.) on the programming interface application. However, the conditional event can be otherwise captured.

In one variation of the method, puppeteering can be used in combination with animation. For example, the driving path of a robot can be specified through a drawing, but the arm position can be directed through physical manipulation of an arm lever. A graphical representation of the arm movement can additionally be subsequently added to the corresponding position along the driving path. However, the robot programming modes can be used separately, in conjunction with a second programming mode, or used in any other suitable manner.

The method can additionally include one or more user device programming modes, which function to permit a user to specify a sequence of robot actions (e.g., program the robot) using a user device. Examples of user device programming modes include an animation programming mode S120, visual programming mode S130, language programming mode, or include any other suitable mode that enables a user to program the robot from a user device. The system can be operable between the puppeteering mode and the user device programming mode(s), concurrently operable in both the puppeteering mode and the user device programming mode(s), or operate in any other suitable manner. When the system is operated in both modes concurrently, the programming inputs extracted from the puppeteering mode can automatically be added to the set of programming inputs (e.g., at a position corresponding to the time at which the puppeted robot action was received) or otherwise processed.

Figure 9:
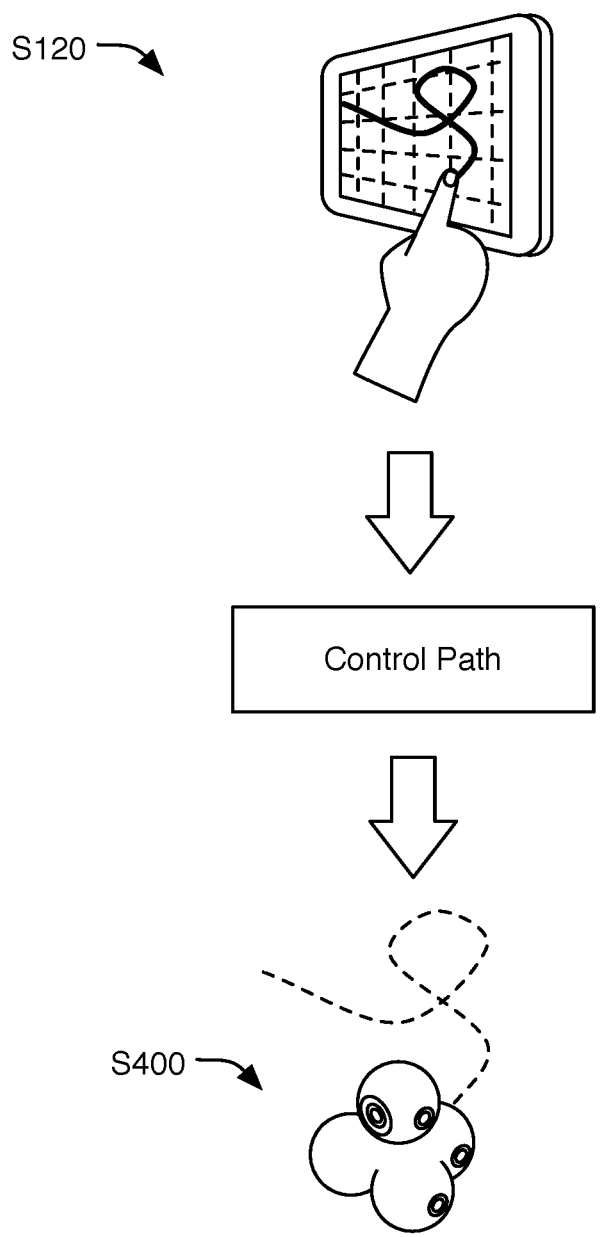
FIG. 9 is a schematic representation of the system operating in an animation programming mode.
Figure 10:
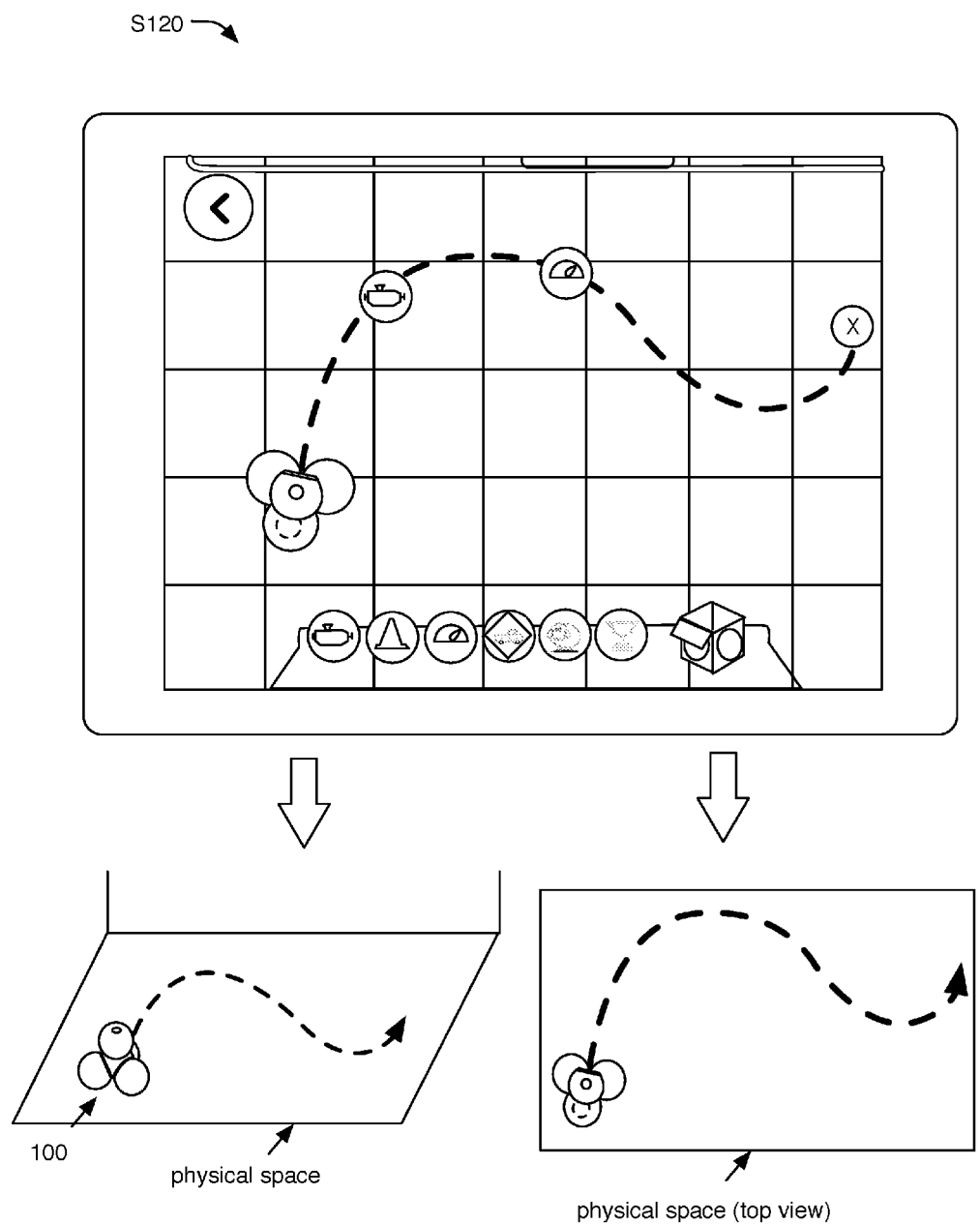
FIG. 10 is a schematic representation of the system operating in a first variation of the animation programming mode.
Figure 11:
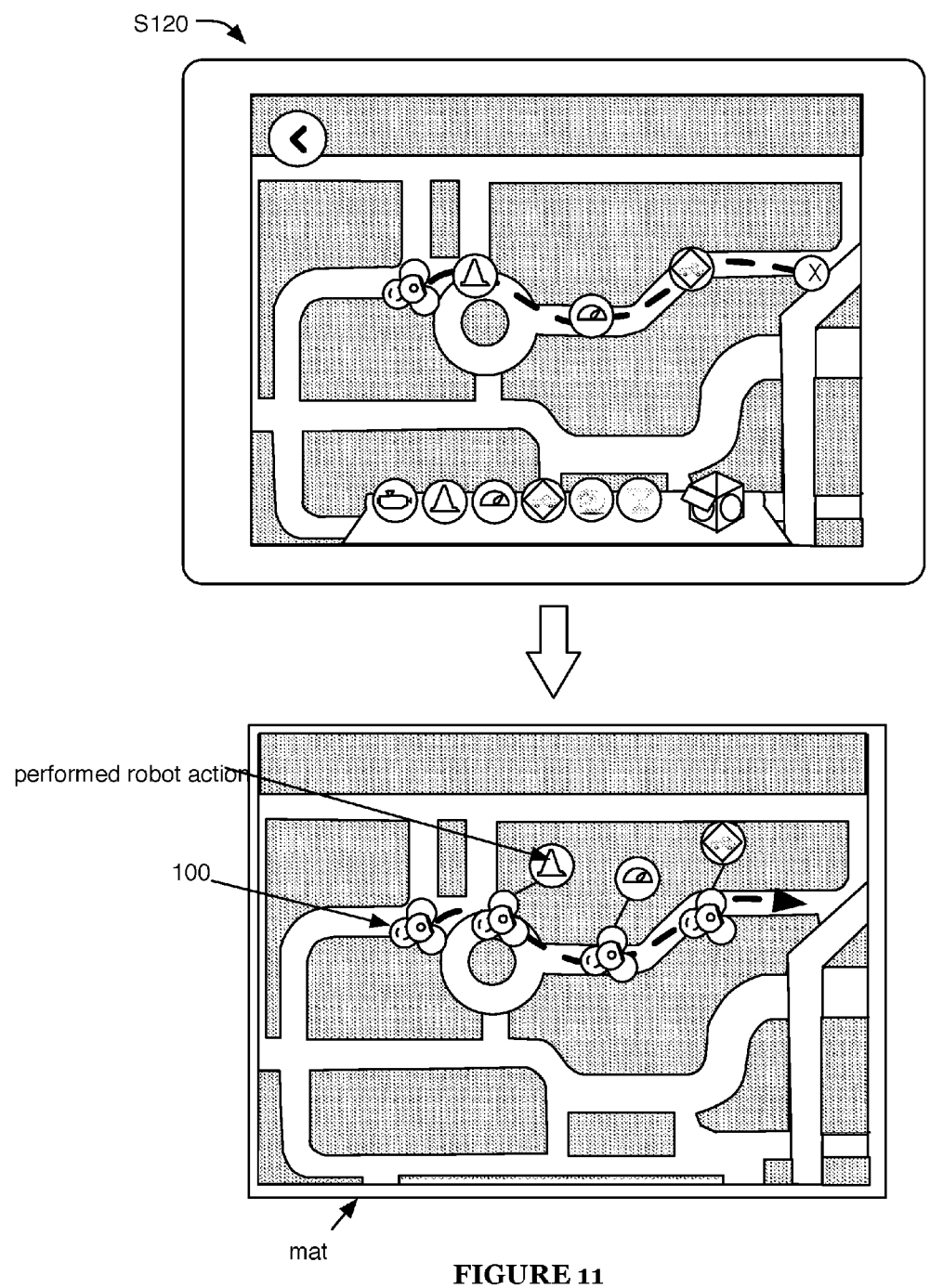
FIG. 11 is a schematic representation of the system operating in a second variation of the animation programming mode.

The animation programming mode S120 can include: receiving a control path at an animation programming interface application and translating the control path to control directives of the robot. The animation programming mode is preferably used to specify a virtual driving path for a robot, but can additionally or alternatively be used to specify robot actions to be performed at user-specified positions along the control path. As shown in FIG. 9, FIG. 10, and FIG. 11, a path can be drawn in a user interface to show the movement a robot should perform as an instruction. In this variation, the method can include: detecting a control path recordation event (e.g., a user selection of a "record path" option); receiving a substantially continuous user input defining the input path (e.g., a path drawn by the user's finger, mouse, or stylus on a touchscreen of the user device); recording a virtual control path within a virtual space consistent with (e.g., approximating, matching, etc.) the input path; and generating control instructions (control directives) for the robot to move the robot along a physical path within a physical space that substantially mirrors the virtual path within the virtual space. The virtual control path preferably includes a set of relative virtual positions (e.g., relative to a starting point, relative to a virtual reference position, etc.), each associated with a relative timestamp, such that the control path is recorded as a function of time. However, the virtual control path can be stored or associated with any other suitable parameter. In one variation, the path can be received by moving a virtual representation of the robot about a virtual grid displayed on the user device, wherein the virtual grid is to-scale relative to the robot. The virtual grid can be representative of the physical environment adjacent the toy robot, or be representative of any other suitable environment.

The animation programming mode S120 can additionally include: recording the speed, acceleration, or any other suitable traversal parameter of user input traversal along the input path; and generating control instructions to move the robot along the physical path with parameters corresponding to (e.g., matching, scaled, etc.) the input path traversal parameters. Alternatively, the traversal parameters associated with the control path (e.g., speed, acceleration, loops and spins, etc.) can be subsequently added to the control path after control path creation or associated with the control path in any other suitable manner. In an alternative variation, recording the control path is expressed by controlling a virtual avatar within the application (e.g., a CG representation of the robot) additionally or alternatively, the robot can respond to the control path as the control path is recorded.

As shown in FIG. 10, the animation programming mode S120 can additionally include receiving statements for auxiliary robot actions to be performed at user-specified positions along the control path. This can function to control other outlets of a robot, such as sound, lights, and mechanism position. The auxiliary robot action statements can be received before, during, or after control path input; before, during, or after robot execution of the control path, or at any other suitable time. The auxiliary robot action statements can be temporally associated with the control path (e.g., associated with a position along the control path based on a shared timestamp between the path position and the robot action statement timestamp), positionally associated with the path (e.g., associated with a path position by a user), or otherwise associated with the path. In the former variation, the robot action statement timestamp can be the time at which the robot action statement was selected, a timestamp assigned to the robot action statement by the user, or be any other suitable timestamp. The auxiliary robot actions can be predetermined, recorded from the ambient environment during path input, or otherwise determined.

In a first example, adding the auxiliary robot action can include dragging and dropping a graphical representation of the auxiliary robot action at a position along a graphical representation of the previously drawn control path. In a second example, adding the auxiliary robot action can include selecting a graphical representation of the auxiliary robot action as the control path is being drawn (e.g., wherein the user can pause or halt path entry, select the graphical representation of the auxiliary robot action, then resume control path entry by selecting the newly-added auxiliary robot action or path end). In a third example, buttons can be tapped while recording a control path to trigger lights. In a fourth example, the microphone of the robot or user device can record audio during control path recordation, wherein the recorded audio can be sent to the robot or retrieved and played back by the robot during physical robot path traversal. However, auxiliary robot actions can be otherwise added to the control path while programming in the animation programming mode.

The control path can additionally include capturing conditional events during the path, which functions to enable dynamic and responsive control instructions to be captured through animating the robot. While recording a path, a user can trigger a conditional capture event, which can sense particular events. For example, while recording a control path, a user can select a "clap count condition"; then the user will clap the number of times that satisfies the condition; and then performs the action that is conditional based on the clap count condition. Other conditional events can include light transitions, phrases (detected through speech recognition), motion conditions, object conditions (e.g., detecting presence of an object through image recognition, depth sensing, or other suitable techniques), facial recognition conditions, or other suitable conditions. The conditional events can be added in a similar manner to adding the auxiliary robot actions, or be added in any other suitable manner.

The animation programming mode S120 can additionally include receiving an animation design document. For example, a control path can be supplied a document that defines the animated actions of the control path. For example, an animation of robot motion can be generated in 3D modeling software (e.g., MAYA, SketchUp, etc.), transferred to the application, and translated to control directives.

In a second example, as shown in FIG. 11, the control path can be defined or limited by an animation design document associated with paths on a physical map (e.g., mat, etc.), wherein the robot can subsequently use markers on the physical map to locate the physical start point on the map corresponding to the control path start path and automatically traverse along the selected control path. The use of an animation design document can enable more advanced and complicated robot actions to be set for a robot.

Figure 12:
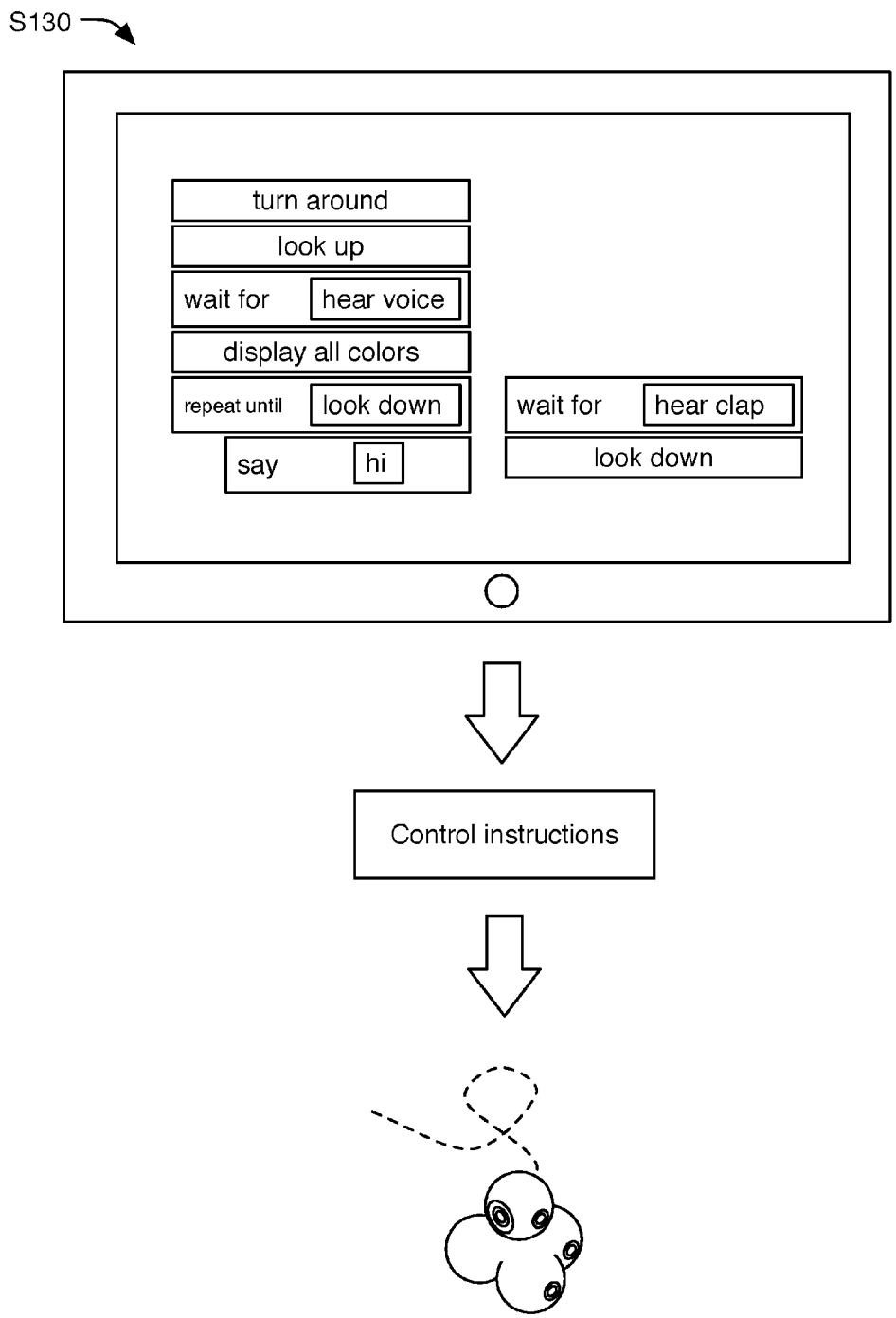
FIG. 12 is an example schematic representation of the system operating in a variation of the visual programming mode.
Figure 13:
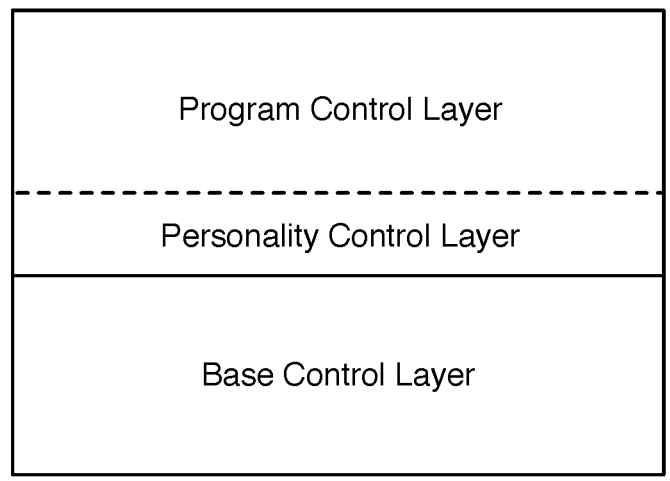
FIG. 13 is a diagram representation of control layers of one variation.

The system can additionally be operable between a visual programming mode S130 (example shown in FIG. 12) and a programming language mode. The visual programming mode can use any suitable visual programming mechanic. For example, programming components can be presented as virtual, connectable blocks that can be arranged and customized to define application logic. In some variations, compilers and/or translation libraries can be implemented such that tools such as Blocky, Scratch, and other suitable visual programming tools can be used. Control paths can be used as blocks within the visual programming mode. Control paths can be used as blocks within the visual programming mode. A programming language mode preferably uses any suitable programming language semantics to provide an environment to define application logic through one or more written routines. For example, C, C++, Java, processing, or any suitable programming language can be used. One or more libraries of robot related functions, variables, data objects, and other suitable programming resources can be exposed and usable within a written code. Additionally, the programming language mode, visual programming mode, the control blocks from the animation mode and puppeteering mode can be used in any suitable combination.

b. Receiving Sensor Data from the Robot at the User Device.

Receiving sensor data from the robot at the user device S200 functions to receive feedback of robot control instruction performance, receive robot inputs for further control instruction generation (e.g., for continued remote robot control), receive data for robot performance analysis, receive data for control path determination (e.g., when the system is operated in a puppeteering mode), or receive data for any other suitable functionality. Receiving sensor data can include: sending sensor data from the robot to the user device, and receiving the sensor data from the robot at the user device. The sensor data can be sent by the robot at a predetermined frequency (e.g., a fixed or variable frequency), sent in response to the occurrence of a transmission event (e.g., in response to depression of a robot button, in response to receipt of a transmission command from the user device, etc.), sent as the sensor data is generated or recorded (e.g., in real- or near-real time), sent in response to robot connection with the user device, or be sent at any other suitable time. The robot can additionally compress, encrypt, or otherwise process the sensor data before transmission. The sensor data can be raw sensor data (e.g., raw sensor signals), processed measurements (e.g., wherein the signals are processed into sensor measurements), sensor summaries (e.g., wherein the measurements can be processed into higher-level summaries), or be any other suitable data. The sensor data can be captured and provided by the robot, by the user device, a remote server system, by a set of secondary robots, by an auxiliary sensor remote from the robot (e.g., external the robot), or by any other suitable computing system. The sensor data can be received by the user device at a predetermined frequency, received in response to the transmission event, received in real- or near-real time, received as the data is sent, or received at any other suitable frequency.

Receiving data from the robot S200 can additionally include connecting the user device to the robot. The user device can be wirelessly connected to the robot, connected to the robot by a wire, or otherwise connected to the robot. The user device is preferably removably or transiently connected to the robot. The user device is preferably connected to the robot in response to selection of a connection icon (e.g., in response to selection of an icon indicative of the robot), or be connected in response to the occurrence of any other suitable connection event. The user device can be simultaneously connected to a single robot or multiple robots. In one variation, the user device can be connected to the robot via a Bluetooth or other short-range connection, wherein the robot can periodically or continuously broadcast a signal upon power-up, the user device can search for and display graphics indicative of robots physically proximal the user device (e.g., limited by the range of the short-range communication) upon selection of a search icon, and the user device can establish a transient connection to the robot in response to selection of the corresponding robot icon. However, the robot can connect to the user device in any suitable manner.

c. Processing the Programming Inputs into Control Instructions.

Processing the programming inputs into control instructions based on the sensor data S300 functions to remotely generate control instructions for the robot, based on the programming inputs received from the user, that respond to the near-instantaneous robot operation conditions. Processing the sensor measurements into control instructions based on the programming inputs can additionally enable the robot to dynamically respond to unexpected environmental or operational conditions, such as an obstruction in the path of the robot, a cliff in the path of the robot, a lack of the requisite accessory, or respond to any other suitable condition. Processing the sensor measurements into control instructions based on the programming inputs can additionally enable the robot to dynamically reflect (e.g., in real- or near-real time) the newly-entered programming input (e.g., perform the operations associated with the programming input), which can enable the set of programming inputs to be debugged as they are entered by the user.

Figure 4:
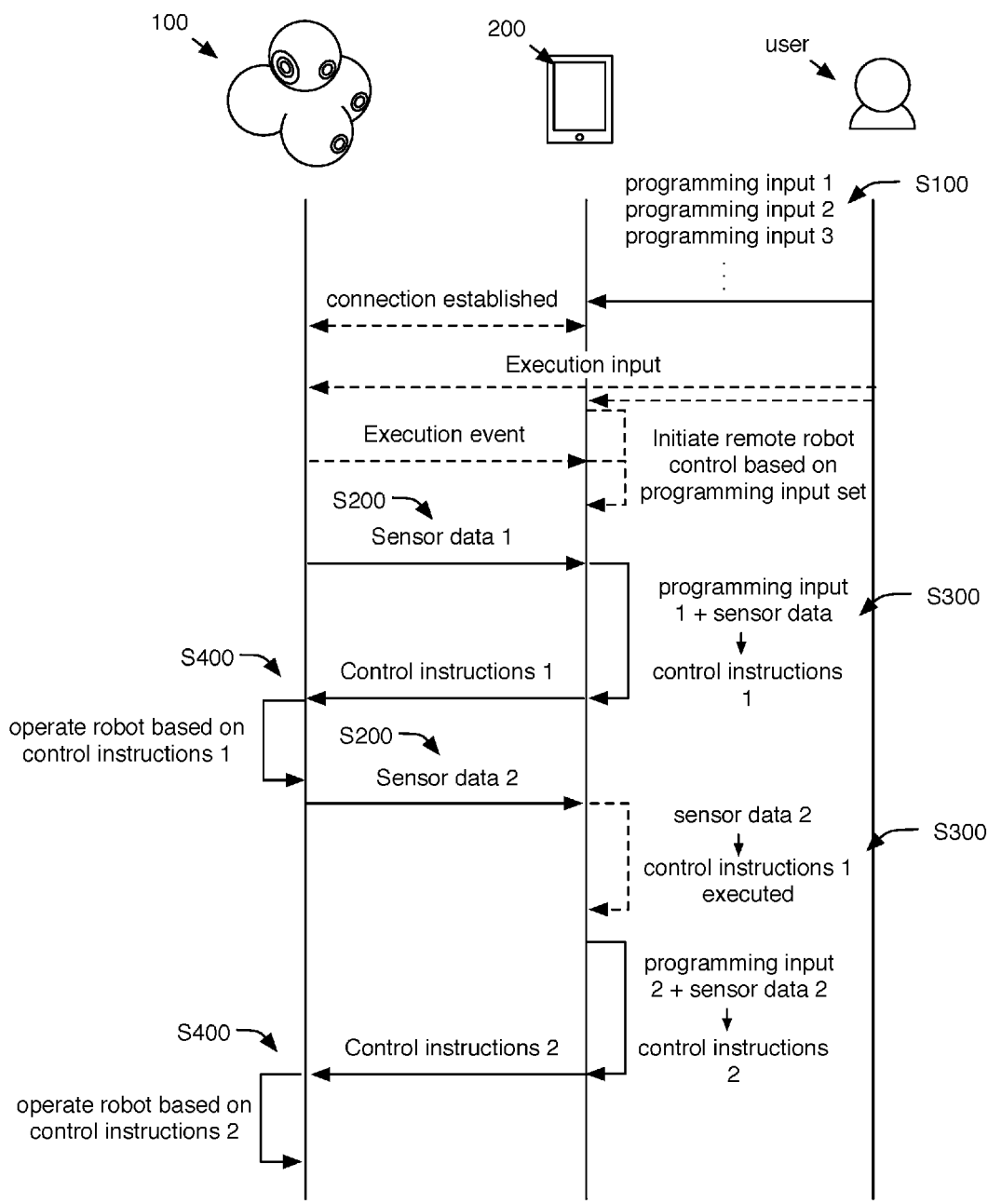
FIG. 4 is a schematic representation of a variation of the method, including executing a set of programming inputs.

As shown in FIG. 4, the control instructions are preferably generated in response to receipt of a user input at the robot (e.g., button actuation at the robot, wherein data indicative of the button actuation can be sent to the user device to trigger control instruction generation), but can alternatively be generated in response to user device connection to the robot, in response to programming input receipt at the programming interface application, in response to a run command received at the programming interface application, or generated in response to the occurrence of any other suitable execution event. The control instructions are preferably entirely generated by the user device (e.g., by the programming interface application), but can alternatively be entirely or partially generated by the robot or a remote computing system. The control instructions are preferably sent to the robot, wherein the robot (more preferably, the robot processor but alternatively any other suitable component) receives the control instructions and operates according to the control instructions (e.g., wherein the processor or other control system controls the robot components to operate according to the control instructions). The control instructions are preferably sent as they are generated, but can alternatively be sent in bundles, sent in response to determination that the last control instruction was performed, or be sent at any other suitable frequency.

Each programming input of the set can be processed together with the remainder of the set, processed in subsets, or processed individually. The programming inputs are preferably processed automatically by the user device, robot, or other computing system, but can alternatively be processed in response to receipt of a user input, processed manually, or processed in any other suitable manner. The programming inputs can be processed into control instructions before the sensor data is received, after the sensor data is received, before the last set of control instructions is determined to have been performed, after the last set of control instructions is determined to have been performed, or be processed into control instructions at any other suitable time.

Processing the programming inputs S300 can include, at the user device: processing a first programming input into a first set of control instructions based on a first set of sensor data in response to receipt of the first set of sensor data; receiving a second set of sensor data; then processing the next programming input in the programming input sequence (e.g., the next unperformed programming input, second programming input, etc.) or subset thereof into a second set of control instructions based on the second set of sensor data (e.g., the subsequently received sensor data). However, the programming inputs can be otherwise processed. The method can additionally include iteratively repeating the method for successive sensor data sets and successive, unperformed programming inputs until the last programming input has been processed and performed. The first and second sets of sensor data can be recorded before the respective programming input is received at the programming interface application, recorded as the respective programming input is received at the programming interface application, or recorded after the respective programming input is received at the programming interface application. The control instructions can additionally or alternatively be generated based on the programming input and secondary data, wherein the secondary data can be user device sensor data, information received from a remote server, or be any other suitable data.

Figure 5:
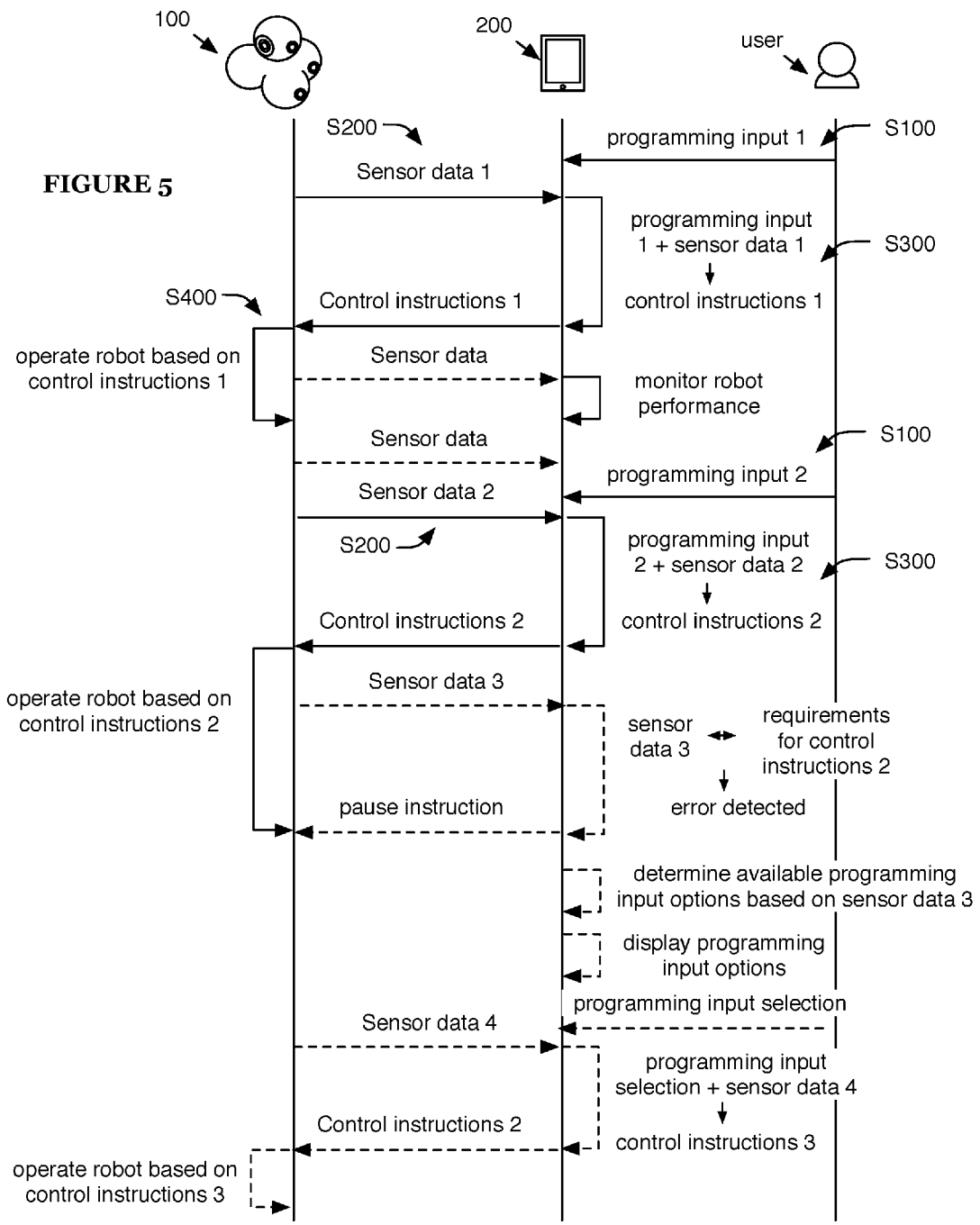
FIG. 5 is a schematic representation of a variation of the method including dynamically executing programming inputs as they are entered into the programming interface application.

In one variation, as shown in FIG. 5, the control instructions are generated and/or sent to the robot as the programming inputs are received. This can function to enable dynamic program debugging. In a second variation, as shown in FIG. 4, the control instructions are generated after the series of programming inputs have been received. This can function to execute entire programs on the robot. However, the control instructions can be generated (and sent) at any suitable time. The second set of sensor data is preferably recorded (by the robot or an external system) during robot operation according to the first set of control instructions, but can alternatively be recorded before or after robot operation according to the first set of control instructions. The second set of sensor data can be sent to the user device (e.g., from the robot or recording device) as the data is recorded, at a predetermined frequency, in response to a request received from the user device, or at any other suitable time.

As shown in FIG. 4, the method can additionally include determining robot performance (execution) of the first set of control instructions based on the second set of sensor data, wherein the next programming input is processed into the second set of control instructions in response to determination that the first set of control instructions have been performed. Performance of the control instruction set can be determined from the sensor data set by matching patterns, values, or other parameters of the sensor data with predetermined patterns, values, or other parameters associated with control instruction performance (e.g., based on the output of the specified robot capability or function, etc.) within a threshold degree of error (e.g., within 5% error). The second programming input can alternatively be processed based on a third set of sensor data, or be processed in any other suitable manner.

The method can additionally include dynamically modifying the set of programming inputs during programming input execution. This can function to permit the user to change the robot programming (e.g., the control path, conditional statements, etc.) on the fly. In this variation, the method can include receiving a programming input set modification as a programming input of the set is being executed, and generating a modified series of programming inputs in response to receipt of the modification. The method can additionally include automatically generating control instructions based on the subsequently received sensor data and the modified series of programming inputs. This can be performed irrespective of which programming input was modified or where the new programming input was inserted (e.g., wherein the robot performs the modified programming input after modification receipt) or be performed only if the modified or new programming input is after the instantaneous execution position within the programming input series. However, the programming input set can be otherwise modified, and robot control can be otherwise affected.

As shown in FIG. 5, the method can additionally include identifying conditions preventing the next unperformed programming input from being performed based on the second set of sensor data. Identifying conditions preventing the next unperformed programming input can include determining an inconsistency between the second set of sensor data and a requirement for the succeeding programming input. However, the obstructing conditions can be determined in any other suitable manner. Examples of conditions preventing the next unperformed programming input from being performed include the presence of an obstruction in the robot movement path, the lack of a required external component (e.g., accessory, support surface, etc.) for the prescribed robot action, or be any other suitable condition.

Identifying conditions preventing the next unperformed programming input from being performed can additionally include pausing robot control instruction execution and notifying the user of the error. Pausing robot control instruction execution can include generating and sending a pause control instruction to the robot, wherein the robot can halt all control instruction execution, halt execution of a subset of control instructions (e.g., those unaffected by the obstructing condition), or respond in any other suitable manner. Notifying the user of the error can include controlling the robot to notify the user of the error (e.g., sending a control instruction to the robot to play "Can't move!" to flash warning lights, or to play warning sirens), displaying a failure notification on the programming interface application or user device, displaying available programming input options on the programming interface application or user device (e.g., displaying a "back up" input option or "turn around" input option), or notifying the user in any other suitable manner. When programming input options are presented to the user, the method can additionally include identifying robot actions (or associated programming inputs) available to the robot based on the sensor data, wherein the displayed programming input options are virtual representations of the available robot actions. The method can additionally include controlling the robot (with the user device) to perform the selected programming input option in response to programming input option selection receipt. Controlling the robot to perform the selected programming input option can include replacing the unperformed programming input with the selected programming input, inserting the selected programming input before the unperformed programming input within the programming input queue, or otherwise preferentially performing the selected programming input. However, the programming inputs can be otherwise processed.

d. Controlling the Robot Based on the Control Instructions.

Controlling the robot based on the control instructions S400 functions to remotely control the robot based on the programming inputs received at the user device. Controlling the robot can include, at the robot: receiving the control instructions at the robot and controlling robot sub-components to execute the control instructions. The control instructions can be received over the same communication channel as that used to send the sensor data, received over a different communication channel or protocol, or received in any other suitable manner. The control instructions can be executed (e.g., the robot operated based on the control instructions) in response to control instruction receipt, within a threshold time period of control instruction receipt (e.g., immediately, as soon as possible, within 5 seconds, etc.), in response to determination of a performance event (e.g., when a conditional event is met), or execute the control instructions at any other suitable time.

e. Robot Personality.

Figure 14:
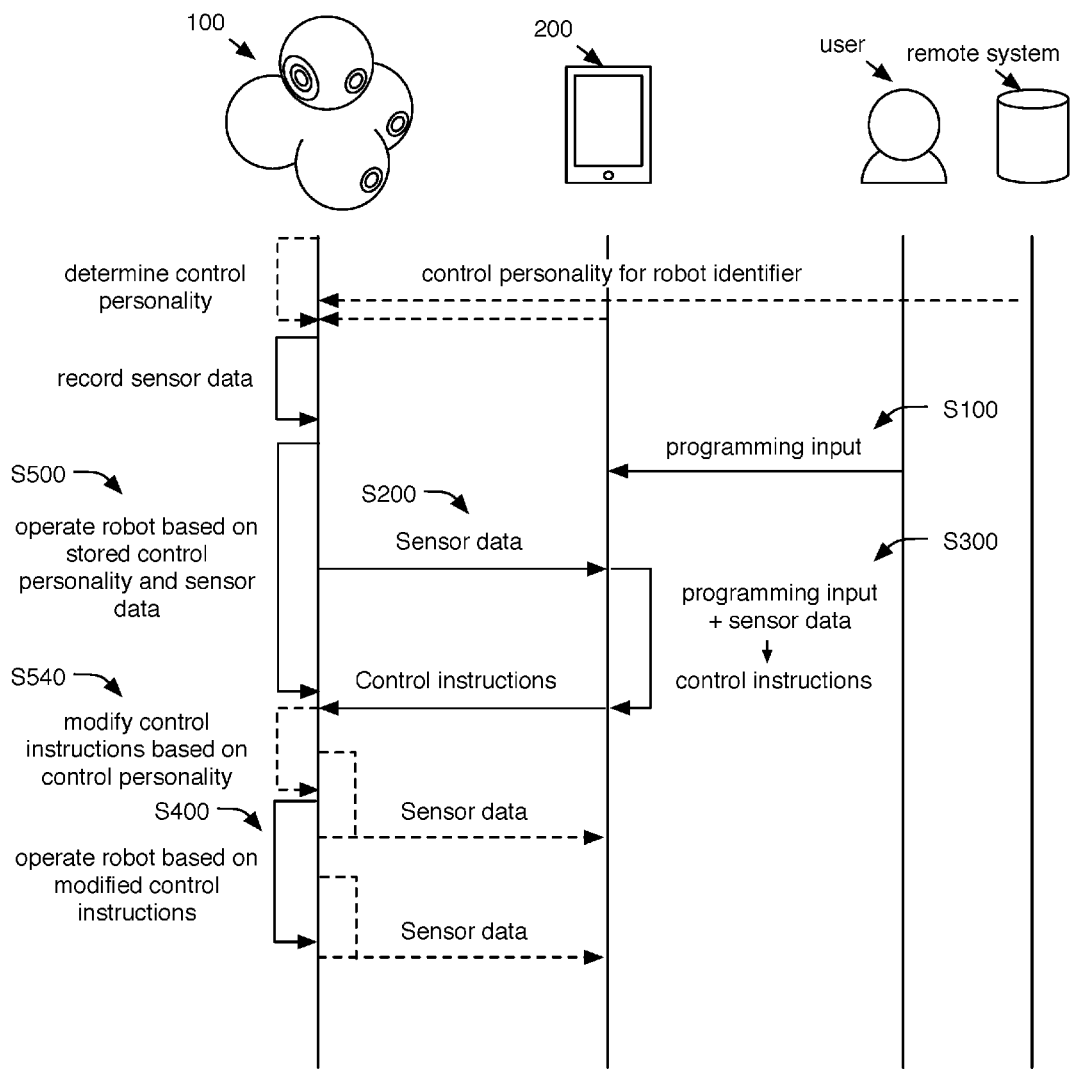
FIG. 14 is a schematic representation of a variation of the method, including operating the robot based on the control personality.

As shown in FIG. 14, the method can additionally include controlling a robot according to a control personality S500. The control personality can include a set of control instructions that control robot operation independent of user device control, and can define the default robot behavior. In one variation, the robot operates according to the control personality in a standby mode (e.g., when the robot is not receiving control instructions from the user device, being otherwise remotely controlled by the user device, or operating in a physical programming mode). In a second variation, the robot can entirely or partially operate according to the personality during user device remote control, wherein the robot actions can be automatically supplemented or modified according to the control personality. However, the robot can operate in any suitable manner based on the control personality.

Controlling a robot according to a control personality S500 functions to execute application logic for directing robot actions. Controlling a robot according to a control personality can include controlling the robot in an autonomous mode and in a delegated control mode (e.g., the user device programming mode). The autonomous mode preferably engages a local control system. The local control system can be used independently from an application. The control instructions in an autonomous mode can be automatically generated based on at least a portion of a personality configuration stored on the robot. For example, when a child plays with a toy robot without an open application, the personality can be used directly control robot action. A local version of the personality configuration preferably specifies various behavioral trigger-response patterns. A delegated control mode is preferably substantially similar to that described above, and can be engaged when an application is in communication with robot and executing control directives. The delegated can additionally or alternatively communicate with a remote control system accessible over the internet or any suitable network infrastructure.

The method can additionally include generating a personality for the robot S520. The personality can be automatically generated (e.g., based on patterns or associations with stored, historical robot actions and/or programming input sets), manually generated, predetermined, or otherwise determined.

In one variation, the history of programming input can impact the personality configuration. The personality configuration preferably reflects the combined "learning" of a robot, which is achieved through receiving programming input. As a user plays with the robot, completes programming challenges, designs customized programs for a robot, the personality can be updated to reflect the types of programming logic or patterns in programming logic. In this variation, determining the personality can include storing a history of programming inputs associated with the robot, identifying a pattern of control instructions or programming inputs from the history of programming inputs, and generating the personality based on the identified pattern.

Figure 15:
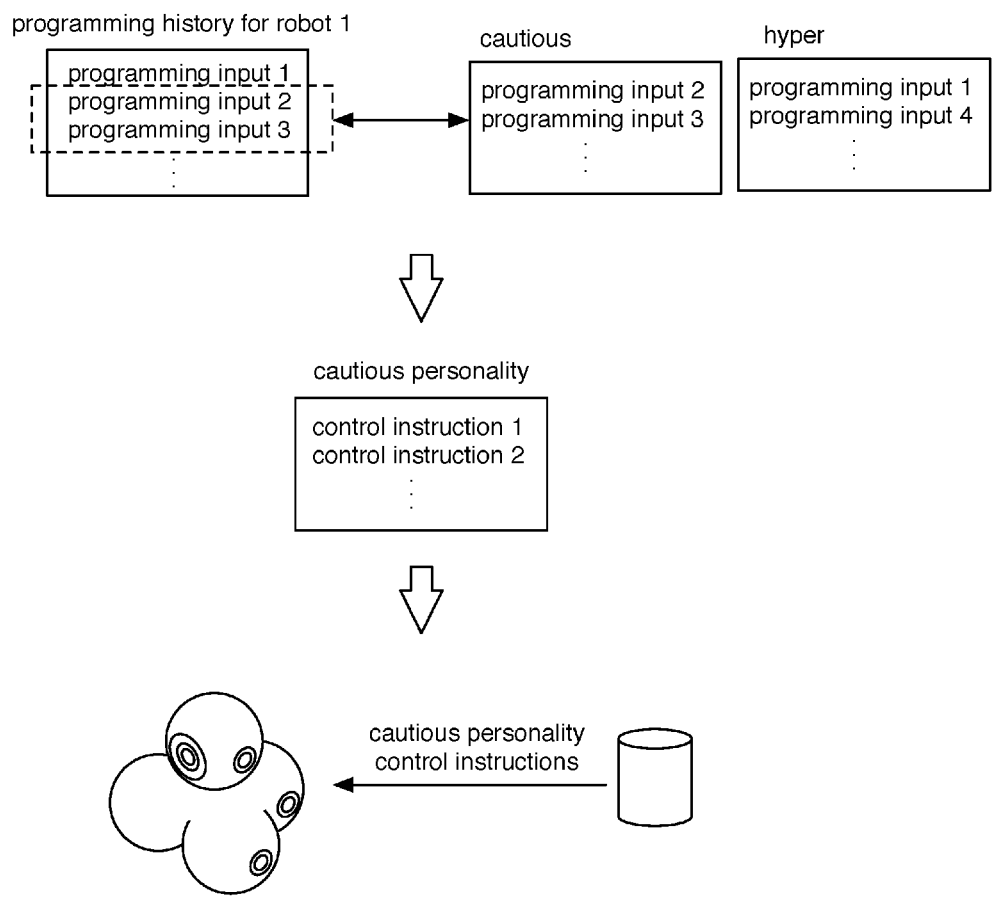
FIG. 15 is a schematic representation of a variation of determining a control personality for the robot.

In a second variation, as shown in FIG. 15, a predetermined pattern of control instructions or programming inputs can be associated with a predefined personality, wherein the predefined personality can be associated with the robot in response to the historical pattern of control instructions substantially matching (e.g., within a threshold margin of error) the respective predetermined pattern. However, the personality can be otherwise determined.

The personality can be generated by the user device, by a remote computing system, by the robot, or by any other suitable system. The personality can be stored on the robot (e.g., wherein the personality is sent to the robot if generated on a separate system), on the user device (e.g., wherein the user device can remotely control the robot, independent of programming inputs), on a remote computing system (e.g., wherein the personality is retrieved by the robot or user device), or on any other suitable computing system.

The control personality can additionally be gradually modified (updated) to reflect the way a user typically programs the robot to behave. For example, if a user is repeatedly cautious about performing new or unknown actions (e.g., using programming inputs, when the historical set of programming inputs reflect a large percentage of actions categorized as "cautious", etc.), the robot can become more cautious in other situations. In a specific example, if a user programs the robot to move in a cautious manner using only straight motion and 90 degree turns, then autonomous control instructions can similarly favor motion parallel to one of two perpendicular axes. In a second example, if a user often programs the robot to move in a "hyper" manner (e.g., the user historically uses programming inputs specifying high-speed movements), then the personality configuration can dictate that the robot perform fast fluid driving actions perhaps adding loops and spins when driving to a destination.

Additionally, personality configuration can define actions to particular types of event triggers. If a user typically plays a sound effect during a particular event, that sound effect can be used as a default for that event. When a new program feedback is received, the program feedback can process the current program; identify any patterns, and calculate personality control instructions as a function of the new program feedback and past control instructions.

The personality configuration update preferably occurs across all applications, but personality updating can be disabled for select applications. Each user account is preferably associated with a single control personality for a given robot identified by a robot identifier (globally unique or non-unique identifier), but can alternatively be associated with multiple control personalities for the robot. In the latter variation, the control personality instantaneously assigned to the robot can be manually selected by the user, automatically selected (e.g., based on time of day, estimated user mood, etc.), or selected in any other suitable manner. Each robot can support (e.g., store) one or more control personalities. In one implementation, multiple users can use a robot where one user logs in and become the active user of a robot at any particular time. Personality can be scoped by robot, by user, by application, by set of applications, or by any suitable scope. Personalities can additionally be saved, shared, forked, or modified in any suitable manner. Additionally, an account or robot can have a set of different personalities that can be selectively activated or used in aggregate. In one implementation, there is a global personality configuration for an account, but a secondary application specific personality that augments the global configuration only when using that particular application. Similarly, a new personality can be formed through combination of other personalities. For example, a default personality configuration of a robot can be used when there is no specific active user, wherein the default personality configuration is a combination of personality configurations from multiple users of the robot.

The method can additionally include supplementing or modifying the control instructions based on the control personality S540, wherein the control instructions are generated based on the programming input (example shown in FIG. 14). The control instructions can be supplemented or modified by the robot, by the user device, or by any other suitable computing system. The control personality preferably works in cooperation with programming input of an application to update how the robot responds to the environment. While programming input is preferably dependent on the currently loaded and possibly the particular application controlling the robot, the personality configuration can be expressed independent of the application and is more dependent on the progressive development of the robot. The programming input preferably specifies high priority control instructions, which preferably receives higher-level priority than personality configuration-based control instructions. The personality configuration can be used as a default customized behavior when explicit control instructions is not supplied by a program or other higher priority control instructions (e.g., safety control instructions). For example, if the personality specifies that red light should be displayed whenever the robot travels above a given speed, the robot can be controlled to display the red light when the control instruction specifies robot traversal at a speed above the threshold speed, even though the control instructions do not specify a display color.

In one variation, the method can include expressing personality non-invasively during application control, which functions to define how personality is acted on while executing a program. A robot preferably maintains some state between programs to promote the notion that the robot is an actual character with a history. Expressing personality non-invasively can include overriding personality with application control. The personality is preferably expressed through outputs. If an application manipulates a particular output, then personality control instructions relating to that output can be overridden for the duration of that application or for the duration of the state in which the application can use that output. For example, if an application is controlling motion of the robot but does not use the speaker or the lights on the robot, then personality configuration will not impact motion of the robot, but can result in actions expressed through the speaker and the lights.

In a second variation, the control instructions can be modified based on the control personality, wherein the output manipulated by the control instructions can be entirely or partially influenced by the personality control instructions. In this variation, the method can include identifying the control instructions as one of a set (e.g., wherein the set is associated with a robot sub-component, wherein the set specifies control instructions that can be modified, etc.) and modifying the control instructions in a predetermined manner, based on the control personality. For example, when the control personality reflects a "hyper" personality, a control instruction specifying robot traversal in a straight line at a substantially constant speed can be modified to include spins, loops, spurts of high-speed traversal, or modified in any other suitable manner. However, the control instructions can be otherwise modified or supplemented.

The method can additionally include updating the programming inputs in real-time, which functions to make programming more interactive. Programming input can be automatically pushed to the robot. The robot's behavior and/or personality can be impacted as a program is edited and/or created. Similarly, debugging and error handling can provide real-time feedback through the robot and/or the programming interface application. Alerts and warnings can be expressed in the user interface as well as in the behavior of the robot. In some cases, the personality configuration can alter how a robot expresses an error or warning, for example, a robot can emulate a "sick" behavior, a "confused" behavior, or an "angry" behavior. Additionally, corrections and changes to fix an error or warning can be updated in real-time. The real-time programming and debugging preferably provides a tighter feedback loop for user's exploring programming.

Figure 16:
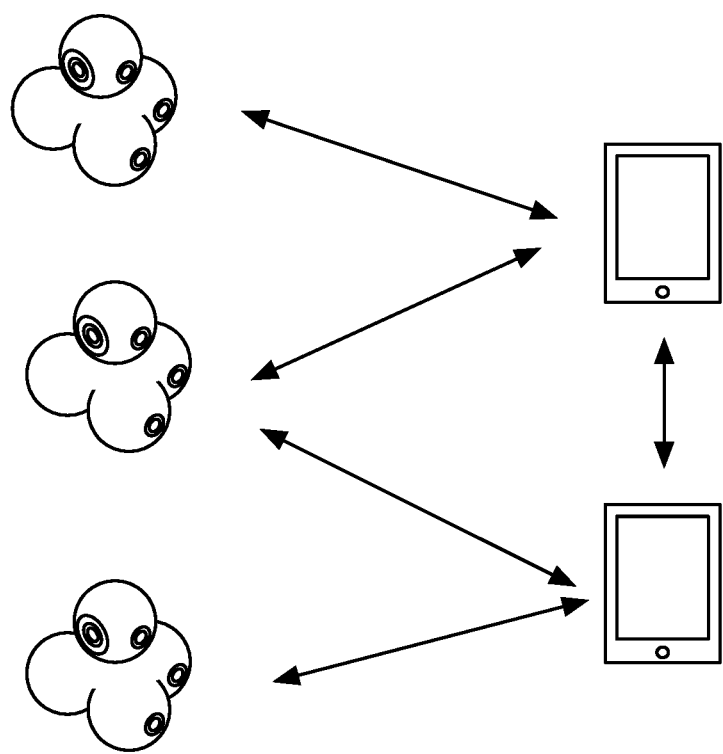
FIG. 16 is a schematic representation of a controller-to-robot topology variation.

Additionally, while the method is described for a one-to-one relationship of applications and robots, the method and system can additionally support many robot to one controller scenarios, one robot to multiple controllers scenarios, and many robots controlled by many controllers as shown in FIG. 16. Multiple, users can collaborate (or compete) in setting programming input for one robot. Similarly, programming input can be transmitted to multiple robots.

The system and method can be embodied and/or implemented at least in part as a machine configured to receive a computer-readable medium storing computer-readable instructions. The instructions are preferably executed by computer-executable components preferably integrated with the robotic system and programming interface application. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for reinforcing programming education through toy robot feedback, the method comprising:
at a user device, remote from the toy robot:
receiving a series of programming inputs from a user at a programming interface application on the user device;
automatically generating a set of control instructions for the toy robot based on a programming input of the series; and
sending the set of control instructions to the toy robot;
at the toy robot:
retrieving a robot personality;
prior to receiving the set of control instructions from the user device, automatically controlling the toy robot based on the robot personality, independent of a connection between the user device and the toy robot;
receiving the set of control instructions from the user device; and
in response to receiving the set of control instructions, operating the toy robot based on the set of control instructions and the robot personality.

2. The method of claim 1, further comprising:
recording, at the toy robot, a set of sensor measurements; and
transmitting the set of sensor measurements from the toy robot to the user device, wherein automatically generating the set of control instructions at the user device comprises automatically generating the set of control instructions based on the programming input of the series and the set of sensor measurements.

3. The method of claim 1, further comprising:
recording, at the toy robot, a set of sensor measurements while automatically controlling the toy robot;
identifying an inconsistency between the set of sensor measurements and a requirement for automatically controlling the toy robot based on the robot personality, independent of the connection between the user device and the toy robot;
in response to identification of the inconsistency, determining a secondary set of personality control instructions based on the set of sensor measurements and the robot personality; and
automatically controlling the toy robot based on the secondary set of personality control instructions, independent of the connection between the user device and the toy robot.

4. The method of claim 1, wherein operating the toy robot comprises operating the toy robot within a threshold time period after receiving the set of control instructions.

5. The method of claim 1, further comprising, at the user device:
presenting, to the user, a set of robot personality identifiers, each representative of a different robot personality;
receiving a user selection of a selected robot personality identifier from the set of robot personality identifiers; and
sending a robot personality identified by the selected robot personality identifier to the toy robot, wherein the selected robot personality is the robot personality retrieved at the toy robot.

6. The method of claim 1, further comprising, at the user device:
storing a historical set of programming inputs from the user;
automatically determining the robot personality based on the historical set of programming inputs; and
sending the robot personality to the toy robot.

7. The method of claim 6, wherein automatically determining the robot personality comprises:
   identifying a pattern of programming inputs from the history of programming inputs; and
   in response to the pattern of programming inputs substantially matching a predetermined pattern of programming inputs, selecting the robot personality associated with the predetermined pattern of programming inputs.

8. The method of claim 1, wherein the robot personality defines an action response to an event trigger, and wherein automatically controlling the toy robot comprises, in response to detecting the event trigger, automatically controlling the toy robot to perform the action response.

9. The method of claim 8, wherein detecting the event trigger comprises detecting motion, wherein performing the action response comprises play a predetermined audio output, and wherein automatically controlling the toy robot comprises, in response to detecting motion at a motion sensor of the toy robot, automatically controlling the toy robot to play the predetermined audio output.

10. The method of claim 1, wherein the set of control instructions specifies robot output for a first subset of a set of robot output types, wherein the robot personality specifies the robot output for a second subset of the set of robot output types, and wherein the set of robot output types comprises robot movement, robot audio output, and robot visual output.

11. The method of claim 10, wherein the first and the second subsets of robot output types are non-overlapping.

12. The method of claim 10, wherein the first and the second subsets of robot output types share an overlapping robot output type, the method further comprising:
   identifying higher priority control instructions by comparing a priority of the set of control instructions to a priority of the robot personality with respect to the overlapping robot output type, wherein operating the toy robot comprises specifying the robot output for the overlapping robot output type based on the higher priority control instructions.

13. The method of claim 1, wherein operating the toy robot comprises:
   modifying the set of control instructions based on the robot personality; and
   operating the toy robot based on the modified set of control instructions.

14. The method of claim 1, further comprising updating the robot personality to specify operation of a toy robot accessory mounted to the toy robot, wherein automatically controlling the toy robot comprises automatically controlling the toy robot accessory based on the robot personality, independent of the connection between the user device and the toy robot, and wherein operating the toy robot comprises operating the toy robot accessory based on the robot personality.

15. A method for reinforcing programming education through toy robot feedback, the toy robot including a set of sensors, the method comprising:
   storing a robot personality at the toy robot;
   at a user device, remote from the toy robot:
      receiving a series of programming inputs from a user at a programming interface application on the user device;
      receiving a first set of sensor measurements from the toy robot; and
      automatically generating a first set of control instructions for the toy robot based on a programming input of the series and the first set of sensor measurements;
   modifying the first set of control instructions based on the robot personality; and
   operating the toy robot based on the modified first set of control instructions.

16. The method of claim 15, wherein operating the toy robot based on the modified first set of control instructions is performed within a threshold time period after modifying the first set of control instructions, and wherein operating the toy robot based on the modified second set of control instructions is performed within the threshold time period after modifying the second set of control instructions.

17. The method of claim 15, further comprising:
   receiving a second set of sensor measurements during operation of the toy robot;
   identifying an inconsistency between the second set of sensor measurements and a requirement for a second set of control instructions, wherein the second set of control instructions is generated based on a succeeding programming input of the series;
   in response to identification of the inconsistency:
      determining a secondary programming input based on the second set of sensor measurements;
      automatically generating a secondary set of control instructions based on the secondary programming input;
      modifying the secondary set of control instructions based on the robot personality; and
      operating the toy robot based on the modified secondary set of control instructions.

18. The method of claim 15, further comprising:
   at the user device:
      storing a historical set of programming inputs associated with the toy robot, the history of programming inputs comprising the series of programming inputs;
      identifying a pattern of conditional control instructions from the history of programming components; and
      automatically generating a third set of control instructions for the toy robot based on a subsequent programming input received from the user at the programming interface application on the user device;
   modifying the third set of control instructions based on the pattern of conditional control instructions and the robot personality; and
   operating the toy robot based on the modified third set of control instructions.

19. The method of claim 15, further comprising, at the toy robot: receiving the robot personality from the user device, wherein modifying the first set of control instructions and modifying the second set of control instructions are each performed at the toy robot.

20. The method of claim 15, wherein modifying the second set of control instructions comprises modifying robot audio output instructions based on the robot personality; and wherein operating the toy robot comprises outputting the robot audio output based on the modified robot audio output instructions.

* * * * *